US012619968B2

(12) United States Patent
Lamba et al.

(10) Patent No.: US 12,619,968 B2
(45) Date of Patent: May 5, 2026

(54) LOCATION-BASED TRANSACTION COMPLETION

(71) Applicant: BLOCK, INC., Oakland, CA (US)

(72) Inventors: Kartik S. Lamba, Berkeley, CA (US); Grace Huey Chen, San Francisco, CA (US); Mathew Wilson, San Francisco, CA (US)

(73) Assignee: Block, Inc., Oakland, CA (US)

( * ) Notice: Subject to any disclaimer, the term of this patent is extended or adjusted under 35 U.S.C. 154(b) by 1072 days.

(21) Appl. No.: 16/924,802

(22) Filed: Jul. 9, 2020

(65) Prior Publication Data

US 2020/0342429 A1 Oct. 29, 2020

Related U.S. Application Data

(63) Continuation of application No. 14/462,430, filed on Aug. 18, 2014, now abandoned.

(51) Int. Cl.
G06Q 20/14 (2012.01)
G06Q 20/32 (2012.01)

(52) U.S. Cl.
CPC ......... G06Q 20/14 (2013.01); G06Q 20/3224 (2013.01)

(58) Field of Classification Search
CPC ...... G06Q 20/10; G06Q 20/40; G06Q 20/102; G06Q 20/105; G06Q 20/108; G06Q 20/1085; G06Q 30/04; G06Q 30/06; G06Q 40/02; G06Q 40/04
USPC ..................................................... 705/39–42
See application file for complete search history.

(56) References Cited

U.S. PATENT DOCUMENTS

| | | | |
|---|---|---|---|
| 5,844,572 A | 12/1998 | Schott | |
| 5,991,749 A | 11/1999 | Morrill | |
| 6,157,927 A | 12/2000 | Schaefer et al. | |
| 7,089,208 B1 | 8/2006 | Levchin et al. | |
| 7,457,767 B1 | 11/2008 | Dunsmore et al. | |

(Continued)

FOREIGN PATENT DOCUMENTS

WO 2015/066059 A1 5/2015

OTHER PUBLICATIONS

Notice of Allowance mailed Jan. 26, 2021, for U.S. Appl. No. 15/607,068, of Kumar, A.R., filed May 26, 2017.

(Continued)

*Primary Examiner* — Hani M Kazimi
(74) *Attorney, Agent, or Firm* — Polsinelli PC

(57) ABSTRACT

In some examples, a buyer in a group may leave an establishment associated with a merchant with an open bill. In response to the buyer leaving the establishment, a transaction associated with that buyer can be completed to pay the buyer's portion of the bill. As one example, a payment service system can receive first beacon information that identifies the presence of a first device at a merchant location. The first device may be associated with a buyer in a group (e.g., a group dining at a restaurant), where the buyer has a transaction record with the merchant. The payment service system can receive second beacon information identifying a second location of the first device that is not associated with the merchant. In response to the first device no longer being present at the merchant location, payment service system can complete the transaction between the buyer and the merchant.

20 Claims, 12 Drawing Sheets

(56) References Cited

U.S. PATENT DOCUMENTS

| | | | |
|---|---|---|---|
| 7,580,699 | B1 | 8/2009 | Shaw et al. |
| 7,596,530 | B1 | 9/2009 | Glasberg |
| 7,877,299 | B2 | 1/2011 | Bui |
| 7,953,642 | B2 | 5/2011 | Dierks |
| 8,015,070 | B2 | 9/2011 | Sinha et al. |
| 8,020,763 | B1 | 9/2011 | Kowalchyk et al. |
| 8,438,066 | B1 | 5/2013 | Yuen et al. |
| 8,498,900 | B1 | 7/2013 | Spirin et al. |
| 8,615,445 | B2 | 12/2013 | Dorsey et al. |
| 8,655,837 | B2 | 2/2014 | Beckstrom et al. |
| 8,744,968 | B1 | 6/2014 | Grigg et al. |
| 8,830,030 | B2 | 9/2014 | Arthurs et al. |
| 8,949,142 | B1 | 2/2015 | Angrish et al. |
| 9,373,112 | B1 | 6/2016 | Henderson et al. |
| 9,393,460 | B1 | 7/2016 | Emigh |
| 9,576,284 | B2 | 2/2017 | Runyan |
| 9,665,858 | B1 | 5/2017 | Kumar |
| 9,721,314 | B2 | 8/2017 | Rose |
| 9,811,846 | B2 * | 11/2017 | Fernandez ......... G06Q 20/3224 |
| 9,875,469 | B1 | 1/2018 | Chin et al. |
| 9,990,621 | B1 * | 6/2018 | Ng ......................... G06Q 20/42 |
| 10,002,397 | B2 | 6/2018 | Rose |
| 10,043,164 | B2 | 8/2018 | Dogin et al. |
| 10,134,032 | B2 | 11/2018 | Govindarajan et al. |
| 10,217,159 | B2 | 2/2019 | Zambo et al. |
| 10,242,351 | B1 | 3/2019 | Wilson et al. |
| 10,304,276 | B2 | 5/2019 | Schwartz et al. |
| 10,373,170 | B2 | 8/2019 | Baker et al. |
| 10,387,874 | B1 | 8/2019 | Birand et al. |
| 10,643,243 | B1 * | 5/2020 | Krishna ............. G06Q 30/0267 |
| 10,726,411 | B2 | 7/2020 | Nuzzi et al. |
| 10,937,049 | B2 | 3/2021 | Scipioni |
| 11,023,869 | B1 | 6/2021 | Kumar |
| 11,037,129 | B1 * | 6/2021 | Chen .................. G06Q 20/3224 |
| 11,270,278 | B2 | 3/2022 | Kumar |
| 2002/0016765 | A1 | 2/2002 | Sacks |
| 2002/0069165 | A1 | 6/2002 | O'Neil |
| 2003/0078793 | A1 | 4/2003 | Toth |
| 2003/0115095 | A1 | 6/2003 | Yamauchi |
| 2003/0172028 | A1 | 9/2003 | Abell et al. |
| 2003/0177020 | A1 | 9/2003 | Okamura |
| 2004/0015403 | A1 | 1/2004 | Moskowitz et al. |
| 2004/0054592 | A1 | 3/2004 | Hernblad |
| 2004/0158494 | A1 | 8/2004 | Suthar |
| 2004/0230489 | A1 | 11/2004 | Goldthwaite et al. |
| 2004/0230526 | A1 | 11/2004 | Praisner |
| 2004/0248548 | A1 | 12/2004 | Niwa et al. |
| 2005/0065851 | A1 | 3/2005 | Aronoff et al. |
| 2005/0071232 | A1 | 3/2005 | Frater |
| 2005/0108116 | A1 | 5/2005 | Dobson et al. |
| 2005/0251440 | A1 | 11/2005 | Bednarek |
| 2006/0111945 | A1 | 5/2006 | Tinsley et al. |
| 2006/0143087 | A1 | 6/2006 | Tripp et al. |
| 2006/0149665 | A1 | 7/2006 | Weksler |
| 2006/0229984 | A1 | 10/2006 | Miyuki |
| 2006/0259311 | A1 | 11/2006 | Stadler et al. |
| 2006/0282660 | A1 | 12/2006 | Varghese et al. |
| 2006/0294025 | A1 | 12/2006 | Mengerink |
| 2007/0174080 | A1 | 7/2007 | Outwater |
| 2007/0244811 | A1 | 10/2007 | Tuminnaro |
| 2008/0003977 | A1 | 1/2008 | Chakiris et al. |
| 2008/0040265 | A1 | 2/2008 | Rackley, III et al. |
| 2008/0071587 | A1 | 3/2008 | Granucci et al. |
| 2008/0195428 | A1 | 8/2008 | O'Sullivan |
| 2008/0195664 | A1 | 8/2008 | Maharajh et al. |
| 2009/0024533 | A1 | 1/2009 | Fernandes et al. |
| 2009/0037286 | A1 | 2/2009 | Foster |
| 2009/0141875 | A1 | 6/2009 | Demmitt et al. |
| 2009/0299869 | A1 | 12/2009 | Cibanof |
| 2009/0307140 | A1 | 12/2009 | Mardikar |
| 2009/0325606 | A1 | 12/2009 | Farris |
| 2009/0327130 | A1 | 12/2009 | Labaton |
| 2010/0010906 | A1 | 1/2010 | Grecia |
| 2010/0030698 | A1 | 2/2010 | Goodin |
| 2010/0069035 | A1 | 3/2010 | Johnson |
| 2010/0082481 | A1 | 4/2010 | Lin et al. |
| 2010/0082485 | A1 | 4/2010 | Lin et al. |
| 2010/0121745 | A1 | 5/2010 | Teckchandani et al. |
| 2010/0131347 | A1 | 5/2010 | Sartipi |
| 2010/0174647 | A1 | 7/2010 | Kowalchyk et al. |
| 2010/0191645 | A1 | 7/2010 | Hougland et al. |
| 2010/0280860 | A1 | 11/2010 | Iskold et al. |
| 2011/0047075 | A1 | 2/2011 | Fourez |
| 2011/0071865 | A1 | 3/2011 | Leeds |
| 2011/0106668 | A1 | 5/2011 | Korosec et al. |
| 2011/0106675 | A1 | 5/2011 | Perlman |
| 2011/0112898 | A1 | 5/2011 | White |
| 2011/0145049 | A1 | 6/2011 | Hertel et al. |
| 2011/0153495 | A1 | 6/2011 | Dixon et al. |
| 2011/0173060 | A1 | 7/2011 | Gallagher |
| 2011/0178883 | A1 | 7/2011 | Granbery et al. |
| 2011/0187664 | A1 | 8/2011 | Rinehart |
| 2011/0201306 | A1 | 8/2011 | Ali |
| 2011/0238514 | A1 | 9/2011 | Ramalingam et al. |
| 2011/0238517 | A1 | 9/2011 | Ramalingam et al. |
| 2011/0251892 | A1 | 10/2011 | Laracey |
| 2011/0258058 | A1 | 10/2011 | Carroll et al. |
| 2011/0283188 | A1 | 11/2011 | Farrenkopf et al. |
| 2011/0307282 | A1 | 12/2011 | Camp et al. |
| 2011/0307547 | A1 | 12/2011 | Backer et al. |
| 2011/0313867 | A9 | 12/2011 | Silver |
| 2011/0313871 | A1 | 12/2011 | Greenwood |
| 2011/0313880 | A1 | 12/2011 | Paul et al. |
| 2012/0016696 | A1 | 1/2012 | Lee |
| 2012/0036754 | A1 | 2/2012 | Van Bortel |
| 2012/0084210 | A1 | 4/2012 | Farahmand |
| 2012/0101942 | A1 | 4/2012 | Park |
| 2012/0115512 | A1 | 5/2012 | Grainger et al. |
| 2012/0130790 | A1 | 5/2012 | Lyons et al. |
| 2012/0130903 | A1 | 5/2012 | Dorsey et al. |
| 2012/0136754 | A1 | 5/2012 | Underwood |
| 2012/0143753 | A1 | 6/2012 | Gonzalez et al. |
| 2012/0150728 | A1 | 6/2012 | Isaacson et al. |
| 2012/0158553 | A1 | 6/2012 | Sudhidhanakul et al. |
| 2012/0166332 | A1 | 6/2012 | Naaman |
| 2012/0173350 | A1 | 7/2012 | Robson |
| 2012/0173396 | A1 | 7/2012 | Melby et al. |
| 2012/0185317 | A1 | 7/2012 | Wong |
| 2012/0185355 | A1 | 7/2012 | Kilroy |
| 2012/0209749 | A1 | 8/2012 | Hammad et al. |
| 2012/0215649 | A1 | 8/2012 | De Judicibus et al. |
| 2012/0246074 | A1 | 9/2012 | Annamalai et al. |
| 2012/0253852 | A1 | 10/2012 | Pourfallah et al. |
| 2012/0265676 | A1 | 10/2012 | Gould et al. |
| 2012/0278201 | A1 | 11/2012 | Milne |
| 2012/0290421 | A1 | 11/2012 | Qawami et al. |
| 2012/0317018 | A1 | 12/2012 | Barnett |
| 2012/0323642 | A1 | 12/2012 | Camp et al. |
| 2013/0006742 | A1 | 1/2013 | Richard |
| 2013/0006853 | A1 | 1/2013 | Amundsen |
| 2013/0018715 | A1 | 1/2013 | Zhou et al. |
| 2013/0041824 | A1 | 2/2013 | Gupta |
| 2013/0054454 | A1 | 2/2013 | Purves et al. |
| 2013/0085877 | A1 | 4/2013 | Ruehrig |
| 2013/0090959 | A1 | 4/2013 | Kvamme et al. |
| 2013/0124412 | A1 | 5/2013 | Itwaru |
| 2013/0126599 | A1 | 5/2013 | Soske et al. |
| 2013/0132274 | A1 | 5/2013 | Henderson et al. |
| 2013/0144731 | A1 * | 6/2013 | Baldwin ............ G06Q 20/3274 705/17 |
| 2013/0151419 | A1 | 6/2013 | Hitchcock et al. |
| 2013/0179348 | A1 | 7/2013 | Crofts et al. |
| 2013/0185124 | A1 | 7/2013 | Aaron et al. |
| 2013/0246220 | A1 | 9/2013 | Hammad et al. |
| 2013/0246301 | A1 | 9/2013 | Radhakrishnan et al. |
| 2013/0254002 | A1 | 9/2013 | Isaacson et al. |
| 2013/0275186 | A1 | 10/2013 | Olives et al. |
| 2013/0282412 | A1 | 10/2013 | Dingler et al. |
| 2013/0282588 | A1 | 10/2013 | Hruska |
| 2013/0290040 | A1 | 10/2013 | Perry et al. |
| 2013/0317835 | A1 | 11/2013 | Mathew |
| 2013/0317893 | A1 | 11/2013 | Nelson et al. |
| 2013/0325663 | A1 | 12/2013 | Scipioni et al. |
| 2013/0339231 | A1 | 12/2013 | Chaitanya |

(56)　　　　　References Cited

U.S. PATENT DOCUMENTS

| 2014/0006184 A1 | 1/2014 | Godsey |
|---|---|---|
| 2014/0006194 A1 | 1/2014 | Xie et al. |
| 2014/0006286 A1 | 1/2014 | Gerban et al. |
| 2014/0032295 A1 | 1/2014 | Cantrell |
| 2014/0046845 A1 | 2/2014 | Dogin et al. |
| 2014/0057648 A1 | 2/2014 | Lyman et al. |
| 2014/0070001 A1 | 3/2014 | Sanchez et al. |
| 2014/0074691 A1 | 3/2014 | Bank et al. |
| 2014/0089135 A1 | 3/2014 | Linh et al. |
| 2014/0100931 A1 | 4/2014 | Sanchez et al. |
| 2014/0108247 A1 | 4/2014 | Artman et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0172727 A1 | 6/2014 | Abhyanker et al. |
| 2014/0180929 A1 | 6/2014 | Ohnishi et al. |
| 2014/0181908 A1 | 6/2014 | Doris-Down et al. |
| 2014/0214652 A1 | 7/2014 | Zheng et al. |
| 2014/0222595 A1 | 8/2014 | Fernandes |
| 2014/0222663 A1 | 8/2014 | Park et al. |
| 2014/0229301 A1 | 8/2014 | Wu |
| 2014/0229560 A1 | 8/2014 | Gray |
| 2014/0279085 A1 | 9/2014 | Ahmad |
| 2014/0279098 A1 | 9/2014 | Ham |
| 2014/0279123 A1 | 9/2014 | Harkey et al. |
| 2014/0310030 A1 | 10/2014 | Cheranda |
| 2014/0310117 A1 | 10/2014 | Moshal |
| 2014/0330654 A1 | 11/2014 | Turney et al. |
| 2014/0330656 A1 | 11/2014 | Zhou et al. |
| 2014/0330713 A1 | 11/2014 | Isaacson et al. |
| 2014/0351130 A1 | 11/2014 | Cheek et al. |
| 2014/0351132 A1 | 11/2014 | Wieler et al. |
| 2014/0358766 A1 | 12/2014 | Nayyar et al. |
| 2014/0365249 A1 | 12/2014 | Ditoro |
| 2015/0012341 A1 | 1/2015 | Amin |
| 2015/0026058 A1 | 1/2015 | Smith |
| 2015/0066742 A1 | 3/2015 | Chatterton et al. |
| 2015/0066746 A1 | 3/2015 | Nichols et al. |
| 2015/0073980 A1 | 3/2015 | Griffin et al. |
| 2015/0094080 A1 | 4/2015 | Bleecher et al. |
| 2015/0120504 A1* | 4/2015 | Todasco ............... G06Q 20/322 |
| | | 705/26.61 |
| 2015/0127394 A1 | 5/2015 | Hogan et al. |
| 2015/0199776 A1 | 7/2015 | Gluck |
| 2015/0242764 A1 | 8/2015 | Subbaraj |
| 2015/0242899 A1* | 8/2015 | Farhi .................. G06Q 30/0261 |
| | | 705/14.58 |
| 2015/0278830 A1 | 10/2015 | Zamer et al. |
| 2015/0339655 A1 | 11/2015 | Basheerahammed et al. |
| 2015/0348001 A1 | 12/2015 | Van Os et al. |
| 2015/0348003 A1 | 12/2015 | Reader |
| 2016/0042351 A1* | 2/2016 | Syed .................. G06Q 20/3221 |
| | | 705/39 |
| 2016/0054428 A1 | 2/2016 | Eldic |
| 2016/0171584 A1 | 6/2016 | Cao |
| 2016/0210606 A1 | 7/2016 | Henderson et al. |
| 2016/0244311 A1 | 8/2016 | Burks et al. |
| 2016/0277560 A1 | 9/2016 | Gruberman et al. |
| 2016/0337373 A1 | 11/2016 | Tseng et al. |
| 2017/0103677 A1 | 4/2017 | Bhattacharjee et al. |
| 2017/0109843 A1 | 4/2017 | Berg et al. |
| 2018/0300825 A1 | 10/2018 | Rose |
| 2018/0349871 A1 | 12/2018 | Moshal |
| 2019/0066191 A1 | 2/2019 | Bansal et al. |
| 2019/0197514 A1 | 6/2019 | Tineo et al. |
| 2020/0104822 A1 | 4/2020 | Govindarajan et al. |
| 2020/0160296 A1 | 5/2020 | Park et al. |
| 2021/0174338 A1 | 6/2021 | Isaacson et al. |
| 2022/0156707 A1 | 5/2022 | Kumar |

OTHER PUBLICATIONS

Final Office Action mailed Feb. 1, 2021, for U.S. Appl. No. 16/011,421, of Rose, C., filed Jun. 18, 2018.

Finn, M., "I Am Here Now: Determining Value in Location Based Services", published by Swinburne University of Technology (2011), pp. 1-11.

Notice of Allowance mailed Sep. 2, 2021, for U.S. Appl. No. 16/011,421, of Rose, C., filed Jun. 18, 2018.

Gneezy et al. "The inefficiency of splitting the bill." The Economic Journal, 114 (2004): 265-280.

Advisory Action mailed Mar. 31, 2021, for U.S. Appl. No. 16/011,421, of Rose, C., filed Jun. 18, 2018.

Non-Final Office Action mailed Apr. 15, 2021, for U.S. Appl. No. 16/011,421, of Rose, C., filed Jun. 18, 2018.

"Advance Dining Reservations—How to make them", published by www.themouseforless.com on Aug. 16, 2013, pp. 1-2.

"Bluetooth Low Energy (BLE) 101: A Technology Primer with Example Use Cases," A Smart Card Alliance Mobile and NFC Council White Paper, dated Jun. 2014, pp. 1-32.

"Divvy makes splitting the check as easy as snap, drag, and pay," Divvy App Website, published May 11, 2013, Retrieved from Internet URL: http://web.archive.org/web/20130511015727/http://divvythatup.com/, on Sep. 6, 2017, pp. 1-2.

"Tab: A Seriously Useful Bill-Splitting App," The Huffington Post, published Aug. 27, 2013, Retrieved from Internet URL: http://www.huffingtonpost.com/2013/08/27 /bill-splitting-app-tab_n_3818225.html>, on Sep. 6, 2017, pp. 1-2.

"White Paper Near Field Communication" Nokia, 2007, pp. 1-8.

"Billr: Bill Splitting at the Table," Billr, iTunes Preview, Retrieved from the internet URL: https://itunes.apple.com/us/app/billr-bill-splitting-attable/id501889312?ls=1&mt=8, on Nov. 4, 2014, pp. 1-2.

"Divvy on the App Store on iTunes," iTunes, Helix Interactive, Retrieved from the internet URL: https://itunes.apple.com/us/app/divvy/id560503890?1s= 1 &mt=8, on Nov. 4, 2014, pp. 1-2.

"Sharing bills & expenses?," WeSplit.It., Retrieved from the internet URL : https://wesplit.it/, on Nov. 4, 2014, pp. 1-2.

"Split bills, share rent & expenses for your sharehouse or holiday, The best way to split bills," dapShare, Retrieved from the internet: URL<http://dapshare.com/, on Nov. 4, 2014, pp. 1-2.

"Split expenses with friends," Splitwise, Retrieved from the internet URL: https://www.splitwise.com/, on Nov. 4, 2014, pp. 1-2.

"Splitabill," Funkbit AS, iTunes Preview, dated Oct. 15, 2012, Retrieved from the internet URL: https://itunes.apple.com/us/app/splitabill/id485048203, on Nov. 4, 2014, pp. 1-2.

"splitabill.com: Take a tour," Splitabill, Retrieved from the internet URL: https://splitabill.com/tour/, on Nov. 4, 2014, pp. 1-2.

"Splitwise," Google Play, dated Oct. 15, 2014, Retrieved from the internet URL: ttps://play.google.com/store/aoos/details?id=com.Splitwise.SplitwiseMobile, on Nov. 4, 2014, pp. 1-2.

"The quickest way to split a bill and calculate the tip at restaurants and bars," Billr.me, Retrieved from the Internet URL: http://billr.me/, on Oct. 29, 2015, pp. 1-4.

"What is Divvy?," Divvy That Up, dated Sep. 17, 2013, Retrieved from the internet URL: http://www.divvythatup.com/, on Nov. 4, 2014, pp. 1-5.

Dodd, A., "dapShare Mobile—Andriod Apps on Google Play," dated Nov. 23, 2011, Retrieved from the internet URL: https://play.google.com/store/apps/details?id=com.dapshare&h1=en, on Nov. 4, 2014, pp. 1-2.

"Goode, L., ""Paying With Square's New Mobile-Payments App,"" All Things D, dated Apr. 30, 2012, Retrieved from the InternetURL: http://allthingsd.com/20120430/paying-with-squares-new-mobile-payments-app/, on Nov. 7, 2014, pp. 1-3".

Non-Final Office Action mailed May 29, 2012, for U.S. Appl. No. 13/192,147, of Dorsey, J., et al., filed Jul. 27, 2011.

Non-Final Office Action mailed Feb. 13, 2013, for U.S. Appl. No. 13/192,147, of Dorsey, J., et al., filed Jul. 27, 2011.

Non-Final Office Action mailed Jun. 11, 2013, for U.S. Appl. No. 13/649,603, of Kumar, A., filed Oct. 11, 2012.

Notice of Allowance mailed Aug. 19, 2013, for U.S. Appl. No. 13/192,147, of Dorsey, J., et al., filed Jul. 27, 2011.

Final Office Action mailed Dec. 5, 2013, for U.S. Appl. No. 13/649,603, of Kumar, A., filed Oct. 11, 2012.

Non-Final Office Action mailed Oct. 14, 2014, for U.S. Appl. No. 13/925,683, of Clark, C., et al., filed Jun. 24, 2013.

(56)                    References Cited

OTHER PUBLICATIONS

Non-Final Office Action mailed Nov. 6, 2014, for U.S. Appl. No. 14/229,654, of Rose, C., filed Mar. 28, 2014.
Non-Final Office Action mailed Jan. 5, 2015, for U.S. Appl. No. 14/219,974, of Rose, C., filed Mar. 19, 2014.
Non-Final Office Action mailed Jan. 28, 2015, for U.S. Appl. No. 13/649,603, of Kumar, A., filed Oct. 11, 2012.
Final Office Action mailed May 13, 2015, for U.S. Appl. No. 13/925,683, of Clark, C., et al., filed Jun. 24, 2013.
Final Office Action mailed May 22, 2015, for U.S. Appl. No. 14/229,654, of Rose, C., filed Mar. 28, 2014.
Final Office Action mailed Jun. 19, 2015, for U.S. Appl. No. 14/219,974, of Rose, C., filed Mar. 19, 2014.
Non-Final Office Action mailed Aug. 26, 2015, for U.S. Appl. No. 14/140,212, of Chin, A., et al., filed Dec. 24, 2013.
Final Office Action mailed Oct. 16, 2015, for U.S. Appl. No. 13/649,603, of Kumar, A., filed Oct. 11, 2012.
Non-Final Office Action mailed Nov. 17, 2015, for U.S. Appl. No. 13/925,683, of Clark, C., et al., iled Jun. 24, 2013.
Advisory Action mailed Dec. 14, 2015, for U.S. Appl. No. 13/649,603, of Kumar, A., filed Oct. 11, 2012.
Non-Final Office Action mailed Jan. 6, 2016, for U.S. Appl. No. 14/219,974, of Rose, C., filed Mar. 19, 2014.
Non-Final Office Action mailed Jan. 20, 2016, for U.S. Appl. No. 14/229,654, of Rose, C., filed Mar. 28, 2014.
Non-Final Office Action mailed Feb. 25, 2016, for U.S. Appl. No. 13/649,603, of Kumar, A., filed Oct. 11, 2012.
Final Office Action mailed May 19, 2016, for U.S. Appl. No. 13/925,683, of Clark, C., et al. filed Jun. 24, 2013.
Final Office Action mailed Jun. 30, 2016, for U.S. Appl. No. 14/229,654, of Rose, C., filed Mar. 28, 2014.
Final Office Action mailed Jul. 11, 2016, for U.S. Appl. No. 14/219,974, of Rose, C., filed Mar. 19, 2014.
Final Office Action mailed Jul. 21, 2016, for U.S. Appl. No. 13/649,603, of Kumar, A., filed Oct. 11, 2012.
Non-Final Office Action mailed Oct. 18, 2016, for U.S. Appl. No. 13/925,683, of Clark, C., et al., filed Jun. 24, 2013.
Notice of Allowance mailed Jan. 26, 2017, for U.S. Appl. No. 13/649,603, of Kumar, A., filed Oct. 11, 2012.
Non-Final Office Action mailed Feb. 10, 2017, for U.S. Appl. No. 14/569,451, of Abrams, Z.C., et al., filed Dec. 12, 2014.
Non-Final Office Action mailed Feb. 22, 2017, for U.S. Appl. No. 14/229,654, of Rose, C., filed Mar. 28, 2014.
Notice of Allowance mailed Mar. 22, 2017, for U.S. Appl. No. 14/219,974, of Rose, C., filed Mar. 19, 2014.
Non-Final Office Action mailed Apr. 10, 2017, for U.S. Appl. No. 14/462,430, of Lamba, K.S., et al., filed Aug. 18, 2014.
Final Office Action mailed May 18, 2017, for U.S. Appl. No. 13/925,683, of Clark, C., et al., filed Jun. 24, 2013.
Final Office Action mailed Aug. 10, 2017, for U.S. Appl. No. 14/229,654, of Rose, C., filed Mar. 28, 2014.

Final Office Action mailed Aug. 25, 2017, for U.S. Appl. No. 14/569,451, of Abrams, Z.C., et al., filed Dec. 12, 2014.
Notice of Allowance mailed Sep. 13, 2017, for U.S. Appl. No. 14/140,212, of Chin, A., et al., filed Dec. 24, 2013.
International Search Report and Written Opinion for International Patent Application No. PCT/US2022/047445, mailed on Jan. 31, 2023.
Non-Final Office Action mailed Jul. 16, 2021, for U.S. Appl. No. 17/314,525, of Kumar, A.R, filed May 7, 2021.
Notice of Allowance mailed Oct. 28, 2021, for U.S. Appl. No. 17/314,525, of Kumar, A.R, filed May 7, 2021.
Non-Final Office Action mailed Aug. 21, 2019, for U.S. Appl. No. 14/462,430, of Lamba, K.S., et al., filed Aug. 18, 2014.
Non-Final Office Action mailed Sep. 27, 2019, for U.S. Appl. No. 15/607,068, of Kumar, A.R., filed May 26, 2017.
Non-Final Office Action mailed Nov. 7, 2019, for U.S. Appl. No. 14/569,451, of Abrams, Z.C., et al., filed Dec. 12, 2014.
Final Office Action mailed Jan. 10, 2020, for U.S. Appl. No. 14/462,430, of Lamba, K.S., et al., filed Aug. 18, 2014.
Final Office Action mailed Feb. 26, 2020, for U.S. Appl. No. 15/607,068, of Kumar, A.R., filed May 26, 2017.
Advisory Action mailed Apr. 21, 2020, for U.S. Appl. No. 14/462,430, of Lamba, K.S., et al., filed Aug. 18, 2014.
Final Office Action mailed May 15, 2020, for U.S. Appl. No. 14/569,451, of Abrams, Z.C., et al., filed Dec. 12, 2014.
Non-Final Office Action mailed Aug. 6, 2020, for U.S. Appl. No. 16/011,421, of Rose, C., filed Jun. 18, 2018.
Non-Final Office Action mailed Sep. 16, 2020, for U.S. Appl. No. 15/607,068, of Kumar, A.R., filed May 26, 2017.
International Search Report and Written Opinion for International Patent Application No. PCT/US2014/062700, mailed Feb. 10, 2015.
Advisory Action mailed Nov. 1, 2017, for U.S. Appl. No. 14/229,654, of Rose, C., filed Mar. 28, 2014.
Final Rejection mailed Dec. 14, 2017, for U.S. Appl. No. 14/462,430, .of Lamba, K.S., et al., filed Aug. 18, 2014.
Notice of Allowance mailed Feb. 6, 2018, for U.S. Appl. No. 14/229,654, of Rose, C., filed Mar. 28, 2014.
Non-Final Office Action mailed Feb. 9, 2018, for U.S. Appl. No. 14/569,451, of Abrams, Z.C., et al., filed Dec. 12, 2014.
Examiner's Answer to Appeal Brief mailed May 4, 2018, for U.S. Appl. No. 13/925,683, of Clark, C., et al., filed Jun. 24, 2013.
Non-Final Rejection mailed Jun. 29, 2018, for U.S. Appl. No. 14/462,430, of Lamba, K.S., et al., filed Aug. 18, 2014.
Final Office Action mailed Aug. 10, 2018, for U.S. Appl. No. 14/569,451, of Abrams, Z.C., et al., filed Dec. 12, 2014.
Final Office Action mailed Feb. 25, 2019, for U.S. Appl. No. 14/462,430 Lamba, K. S., filed Aug. 18, 2014.
Advisory Action mailed Oct. 24, 2018, for U.S. Appl. No. 14/569,451 of Abrams, Z.C., filed Dec. 12, 2014.
Advisory Action mailed May 9, 2019, for U.S. Appl. No. 14/462,430, of Lamba, K.S., et al., filed Aug. 18, 2014.
Non-Final Rejection mailed Jun. 14, 2019, for U.S. Appl. No. 14/569,451, of Abrams, Z.C., et al., filed Dec. 12, 2014.

* cited by examiner

400

146

402
202
422

BILL FOR MegaStraunt Restaurant, Table 5:    SHARE BILL

404 — GARDEN SALAD    $4.00
406 — GRILLED CHICKEN SANDWICH    $10.99
408 — ICED TEA    $2.50
410 — CAESAR SALAD    $3.00
412 — CHEESEBURGER    $9.99
414 — SOFT DRINK    $2.50
420 —
416 — CHANGE TIP GRATUITY    $6.60
418 — TOTAL    $39.58

426

428

402
202
430

SELECT ITEMS TO DIVIDE BILL WITH A FIRST PARTY:    DONE

404 — GARDEN SALAD    $4.00
406 — GRILLED CHICKEN SANDWICH    $10.99
408 — ICED TEA    $2.50
410 — CAESAR SALAD    $3.00
412 — CHEESEBURGER    $9.99
414 — SOFT DRINK    $2.50
420 —
416 — CHANGE TIP GRATUITY    $6.60
418 — TOTAL    $39.58

500

502

202

AMOUNT TO BE SHARED BY FIRST PARTY:

504 → $15.49 + $3.10 TIP = $18.59

506

ENTER CONTACT INFORMATION OF PARTY TO SPLIT BILL:

508

EMAIL ADDRESS

510

SELECT PARTY FROM CONTACTS:

GO TO CONTACTS

SEND REIMURSEMENT REQUEST    512

Figure 6:
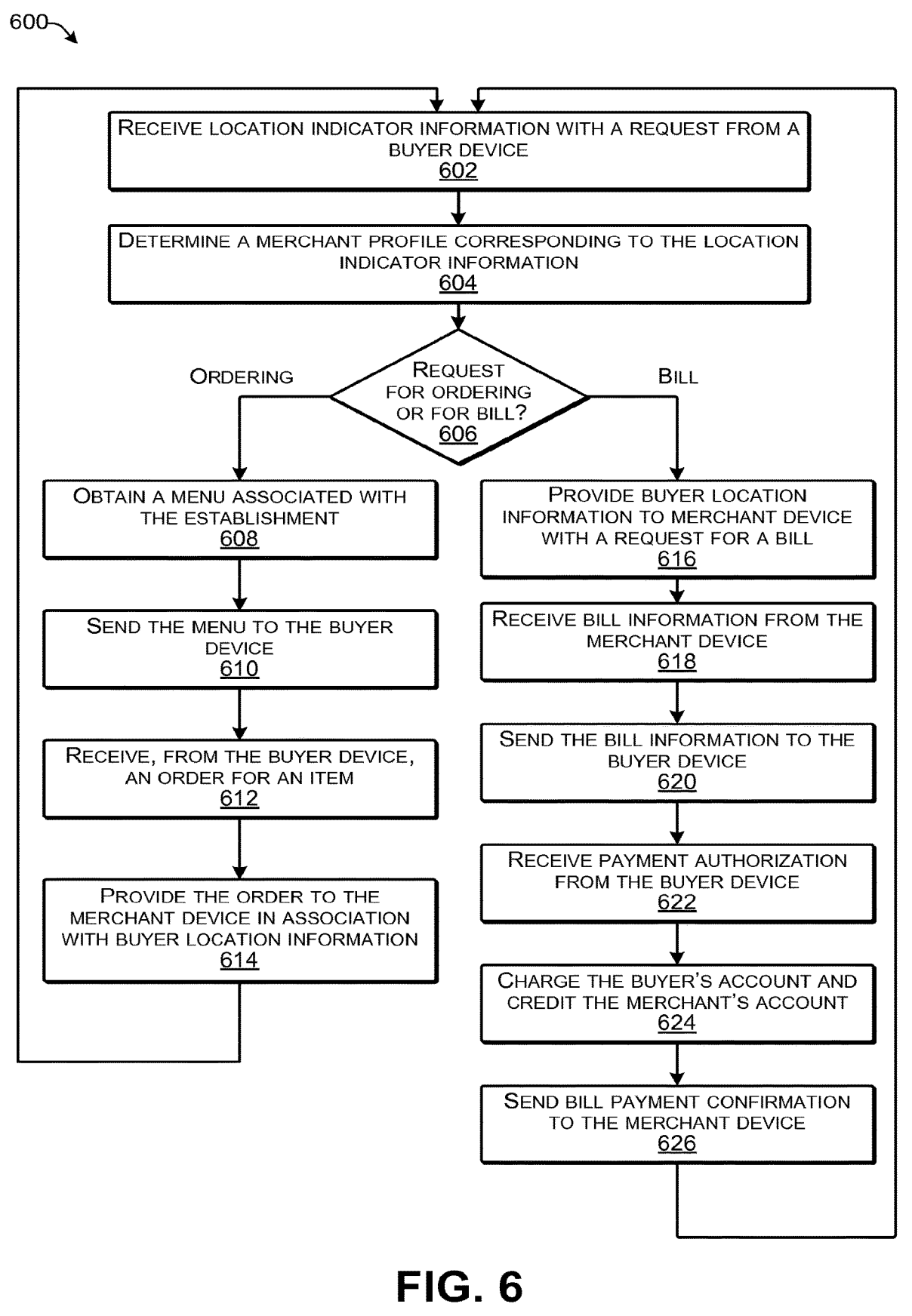

600

RECEIVE LOCATION INDICATOR INFORMATION WITH A REQUEST FROM A
BUYER DEVICE
602

DETERMINE A MERCHANT PROFILE CORRESPONDING TO THE LOCATION
INDICATOR INFORMATION
604

REQUEST
FOR ORDERING
OR FOR BILL?
606

ORDERING

BILL

OBTAIN A MENU ASSOCIATED WITH
THE ESTABLISHMENT
608

SEND THE MENU TO THE BUYER
DEVICE
610

RECEIVE, FROM THE BUYER DEVICE,
AN ORDER FOR AN ITEM
612

PROVIDE THE ORDER TO THE
MERCHANT DEVICE IN ASSOCIATION
WITH BUYER LOCATION INFORMATION
614

PROVIDE BUYER LOCATION
INFORMATION TO MERCHANT DEVICE
WITH A REQUEST FOR A BILL
616

RECEIVE BILL INFORMATION FROM THE
MERCHANT DEVICE
618

SEND THE BILL INFORMATION TO THE
BUYER DEVICE
620

RECEIVE PAYMENT AUTHORIZATION
FROM THE BUYER DEVICE
622

CHARGE THE BUYER'S ACCOUNT AND
CREDIT THE MERCHANT'S ACCOUNT
624

SEND BILL PAYMENT CONFIRMATION
TO THE MERCHANT DEVICE
626

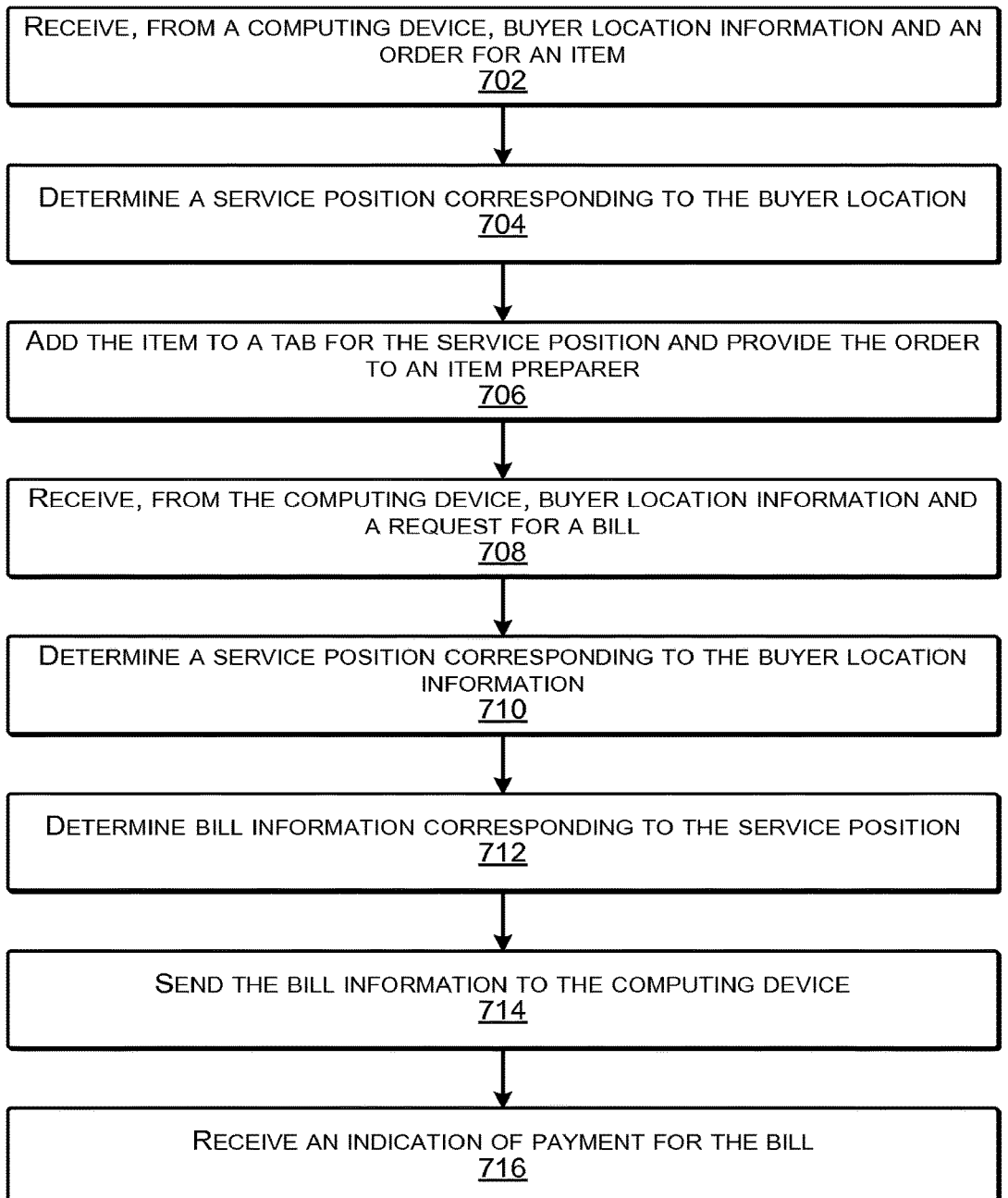

RECEIVE, FROM A COMPUTING DEVICE, BUYER LOCATION INFORMATION AND AN ORDER FOR AN ITEM
702

DETERMINE A SERVICE POSITION CORRESPONDING TO THE BUYER LOCATION
704

ADD THE ITEM TO A TAB FOR THE SERVICE POSITION AND PROVIDE THE ORDER TO AN ITEM PREPARER
706

RECEIVE, FROM THE COMPUTING DEVICE, BUYER LOCATION INFORMATION AND A REQUEST FOR A BILL
708

DETERMINE A SERVICE POSITION CORRESPONDING TO THE BUYER LOCATION INFORMATION
710

DETERMINE BILL INFORMATION CORRESPONDING TO THE SERVICE POSITION
712

SEND THE BILL INFORMATION TO THE COMPUTING DEVICE
714

RECEIVE AN INDICATION OF PAYMENT FOR THE BILL
716

FIG. 7

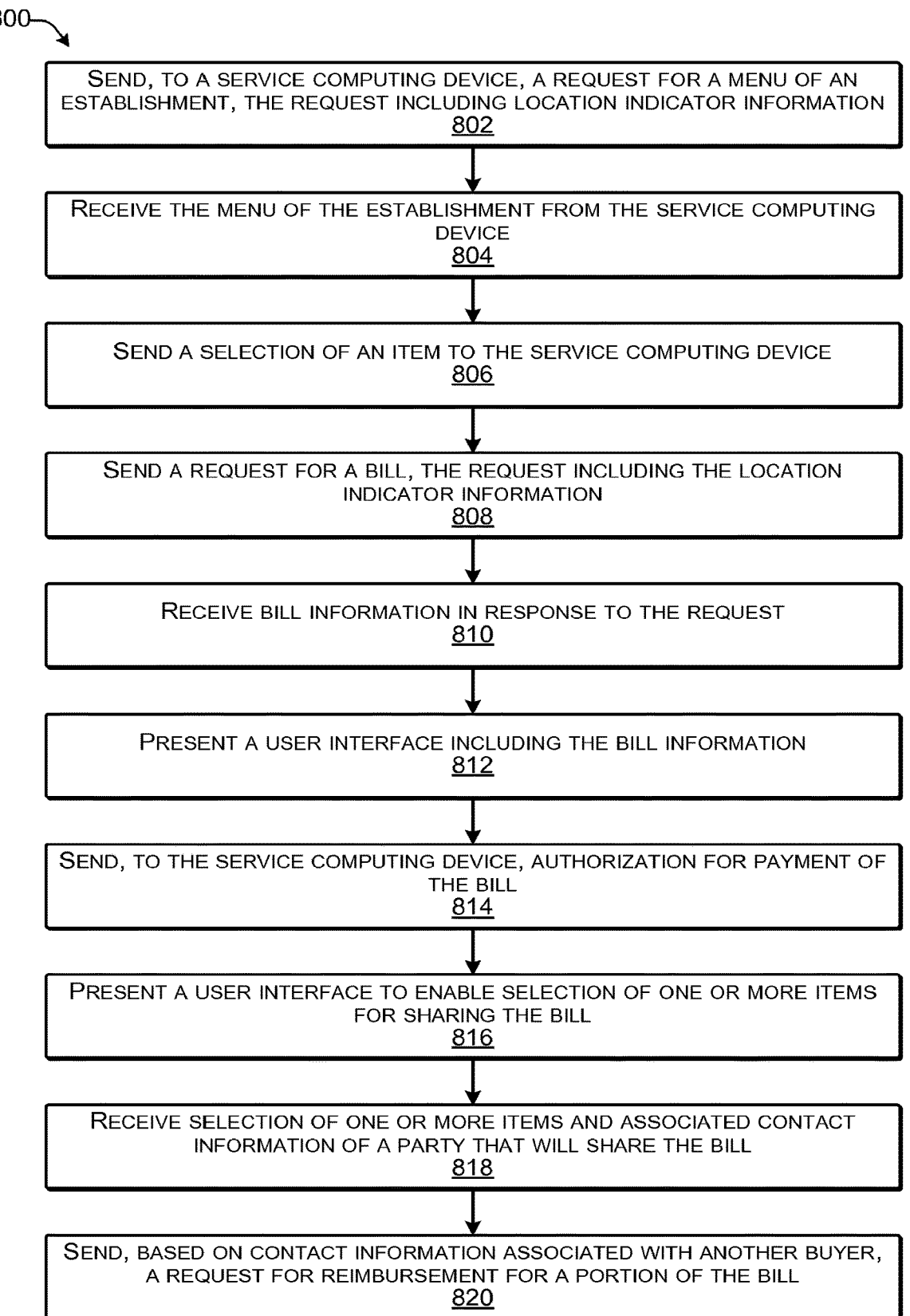

800

SEND, TO A SERVICE COMPUTING DEVICE, A REQUEST FOR A MENU OF AN ESTABLISHMENT, THE REQUEST INCLUDING LOCATION INDICATOR INFORMATION
802

RECEIVE THE MENU OF THE ESTABLISHMENT FROM THE SERVICE COMPUTING DEVICE
804

SEND A SELECTION OF AN ITEM TO THE SERVICE COMPUTING DEVICE
806

SEND A REQUEST FOR A BILL, THE REQUEST INCLUDING THE LOCATION INDICATOR INFORMATION
808

RECEIVE BILL INFORMATION IN RESPONSE TO THE REQUEST
810

PRESENT A USER INTERFACE INCLUDING THE BILL INFORMATION
812

SEND, TO THE SERVICE COMPUTING DEVICE, AUTHORIZATION FOR PAYMENT OF THE BILL
814

PRESENT A USER INTERFACE TO ENABLE SELECTION OF ONE OR MORE ITEMS FOR SHARING THE BILL
816

RECEIVE SELECTION OF ONE OR MORE ITEMS AND ASSOCIATED CONTACT INFORMATION OF A PARTY THAT WILL SHARE THE BILL
818

SEND, BASED ON CONTACT INFORMATION ASSOCIATED WITH ANOTHER BUYER, A REQUEST FOR REIMBURSEMENT FOR A PORTION OF THE BILL
820

FIG. 8

LOCATION-BASED TRANSACTION COMPLETION

CROSS-REFERENCE TO RELATED APPLICATIONS

This application claims priority to and is a continuation of U.S. patent application Ser. No. 14/462,430, filed on Aug. 18, 2014, entitled "LOCATION-BASED TRANSACTION COMPLETION," the entirety of which is herein incorporated by reference.

BACKGROUND

When a customer at a restaurant has finished eating, the customer may typically ask to pay the bill. However, obtaining and paying the bill can often take a substantial amount of time. For example, the customer may have to first get the server's attention, ask for the bill, and wait while the server totals the bill and delivers the bill to the table. The customer then reviews the bill and provides a credit card, cash, or other payment instrument to the server. The server picks up the bill with the payment instrument and subsequently delivers change if the customer is paying with cash, or delivers a credit card receipt for signature if the customer is paying with credit card. Thus, the conventional process for paying a bill can be time-consuming.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 is a block diagram illustrating an example process for location-based payments according to some implementations.

FIG. 7 is a block diagram illustrating an example process for location-based payments according to some implementations.

FIG. 8 is a block diagram illustrating an example process for location-based payments according to some implementations.

DETAILED DESCRIPTION

Figure 1:
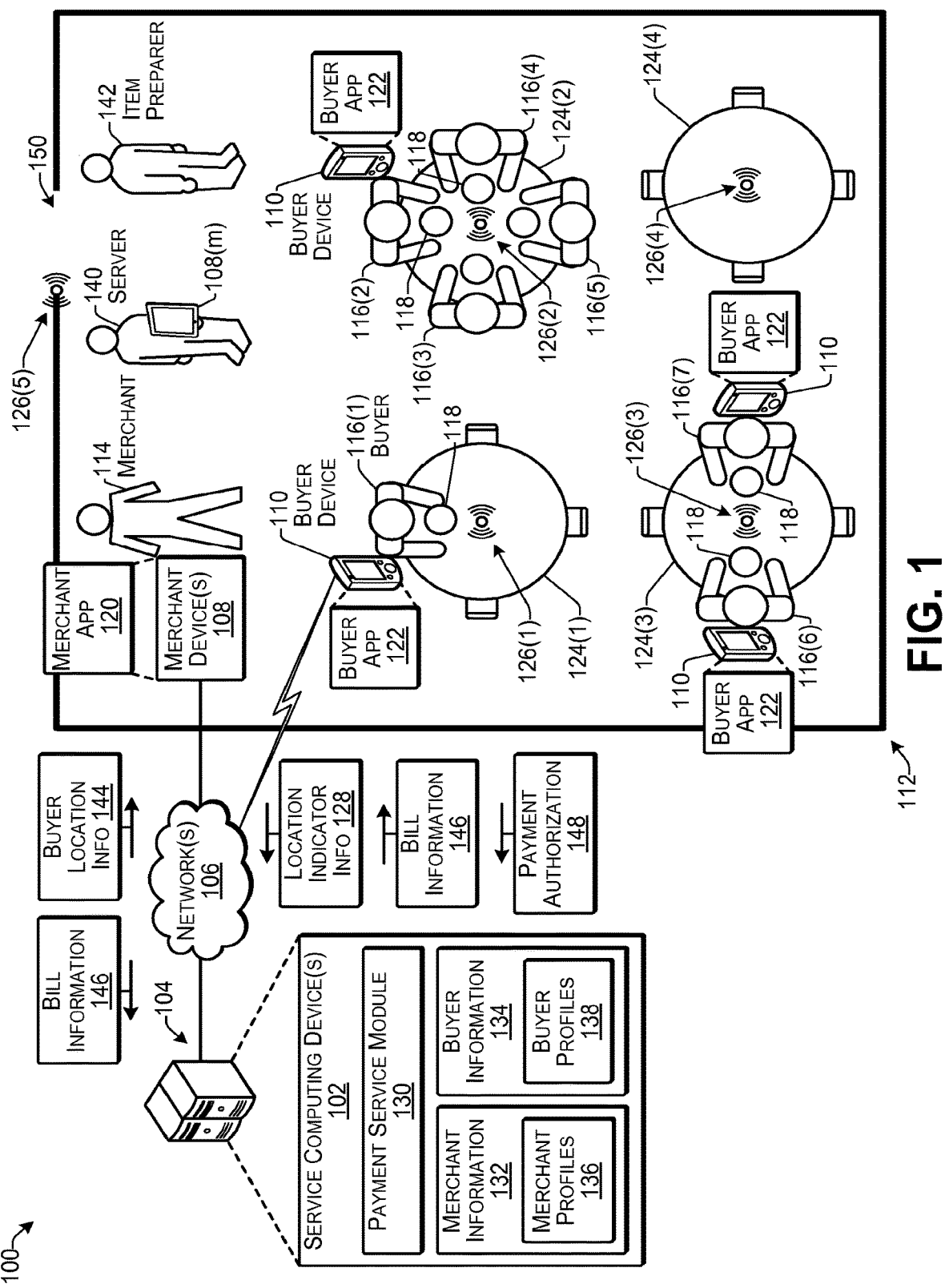
FIG. 1 illustrates an example environment for enabling location-based payments according to some implementations.

Some implementations described herein include techniques and arrangements for enabling buyers (e.g., customers) to pay a bill using a buyer device, such as a mobile computing device. For example, when a buyer at a restaurant or other establishment is ready to leave the establishment, the buyer may use an application on the buyer device to request the bill. In response, the bill may be automatically matched with the correct buyer based at least in part on the buyer's location at the establishment. The buyer device receives the bill and presents the bill on a display. The buyer can review the presented bill, add a gratuity, and authorize payment of the bill using the buyer device. Thus, the buyer may pay the bill and depart from the establishment when the buyer is ready to leave, without having to interact with the server or other establishment personnel to pay the bill.

In some examples, the buyer application on the buyer device may communicate with a service computing device associated with a service provider that also provides a payment service to the establishment. In response to receiving a request for the bill from the buyer device, the service computing device may obtain the bill for the particular buyer from a merchant device associated with the establishment. As one example, the tables in the establishment may have a respective wireless beacon or other location indicator associated with each table. The location indicator associated with a particular table may continually emit location indicator information that may be used to determine the physical location of the buyer, e.g., the buyer is located at a particular table number at a particular establishment. The buyer application is able to automatically receive the location indicator information and report the location indicator information to the service computing device, such as in conjunction with a request from the buyer to place an order or to pay a bill.

In some examples, the service computing device is able to determine the location of the buyer by matching the received location indicator information with information in a data structure to determine at least an establishment at which the buyer is located. Further, in some cases, the data structure may also indicate a particular table or other particular service position at the establishment. For instance, the data structure may be maintained by the service computing device based on information provided by the establishment, or may be maintained at a network location, such as at a website, to which the establishment has provided the physical location information. In other examples, the service provider may determine the establishment in which the buyer is located based on global positioning system (GPS) information received from the buyer device or from other location information received from the buyer device.

The service computing device communicates the buyer location information to a merchant device, e.g., a point of sale (POS) computing device or other computing device associated with the establishment. Based at least in part on the received buyer location information, the merchant device is able to determine a particular table or other service position at the establishment corresponding to the buyer location information received from the service computing device. For instance, the merchant device may match the particular table with an open tab corresponding to the particular table and may generate a bill based on the open tab. The merchant device sends the bill information to the service computing device, and the service computing device sends the bill information to the buyer device. The buyer device may present the bill information in a user interface on a display of the buyer device. The buyer can utilize the user interface on the buyer device to review the bill, add a gratuity, and instruct the service computing device to provide payment to the establishment. In response, the service computing device may charge an account of the buyer for the payment, credit an account of the establishment with the payment, and may communicate confirmation of payment to the merchant device at the establishment.

In some examples, in addition to being able to pay the bill, the buyer may be able to use the buyer device to place an order with the establishment based on the buyer's location in the establishment. For instance, in response to receiving a request to place an order and location indicator information from the buyer device, the service computing device may provide a menu from the establishment for presentation on the buyer device. The buyer may select one or more items from the menu, and the selection is forwarded by the service computing device to the merchant device along with buyer location information that indicates a service position at which the buyer is located in the establishment. The merchant device associates the order with a service position, such as by starting a tab for a particular table corresponding to the buyer's location, and provides a notification to an item preparer to prepare the requested item. When the item has been prepared, a server may deliver the item to the buyer at the service position associated with the order. The buyer subsequently may be able to add additional items to the tab, such as by selecting additional items from the menu on the buyer device, by ordering directly from the server, or the buyer may use the buyer device to pay the bill and leave, as discussed above.

Additionally, in some examples, multiple buyers at a table may each be able to order items individually and may each pay for their respective bills using their own buyer devices. For instance, the merchant device may send bill information for multiple bills associated with a service position to the service computing device, and the service computing device may distinguish between an order of a first buyer and an order of a second buyer at the same table, and may ensure that the correct bill is matched with the respective orders placed by each buyer. Alternatively, in other examples, a particular buyer at a table may pay the bill for the entire table and, in the case that the bill is being shared by multiple buyers, the particular buyer may utilize a user interface provided by the buyer application to divide the bill according to the items ordered by each buyer. In some cases, the buyer application may communicate with a peer-to-peer payment module on the buyer device to cause the peer-to-peer payment module to automatically send an electronic request for reimbursement to each of the other buyers that are going to share the bill.

Further, in some cases, the server may use a mobile implementation of the merchant device to take the order of the buyer. For example, the mobile merchant device may be carried by the server when taking orders from buyers. The mobile merchant device may receive location indicator information from a particular location indicator at the buyer's table or other service position. The mobile merchant device may automatically associate the particular location indicator information with the buyer's order entered by the server. Additionally, the merchant application on the mobile merchant device or on another merchant device may determine the particular table number or other physical service position identifier that corresponds to the received location indicator information, such as for use in specifying a location to which to deliver the order.

For discussion purposes, some example implementations are described in the environment of a service provider that provides a bill to a buyer at an establishment and provides the payment from the buyer to the establishment. However, implementations herein are not limited to the particular examples described, and may be extended to other types of establishments, other types of payments, other environments, other system architectures, and so forth, as will be apparent to those of skill in the art in light of the disclosure herein.

FIG. 1 illustrates an example environment 100 for a location-based payment service according to some implementations. For instance, the environment 100 may enable a buyer to order and/or make a payment for goods and/or services (referred to herein as items) received from an establishment without having to obtain or pay a physical bill. In the illustrated example, one or more service computing devices 102 associated with a service provider 104 are able to communicate over one or more networks 106 with one or more merchant devices 108 and one or more buyer devices 110. In some examples, the service provider 104 may be any business, enterprise, or other entity that offers, sells, supplies or otherwise enables the services herein.

The merchant device 108 may be associated with an establishment 112 of a merchant 114, such as at a particular geographic location. In some examples, the establishment 112 may be a restaurant, a bar, a club, a public house, a café, or other business that enables buyers 116 to order and receive items 118 on a tab, e.g., without having to pay each time an item is provided. Examples of items 118 according to some implementations may include food items, beverages, services, or the like, although implementations herein are not limited to any particular types of items 118. The merchant device 108 may be a computing device that includes an instance of a merchant application 120 that executes on the respective merchant device 108. In some examples, the merchant application 120 may provide POS functionality to the merchant device 108 to enable the merchant 114 to accept payments at a POS location, e.g., the establishment 112. For example, the merchant 114 may use the merchant device 108 to accept payments at the establishment 112 from a plurality of the buyers 116 using a variety of payment instruments, such as payment cards, cash, check, etc., in addition to the electronic payments discussed herein. However, in other examples, the merchant device 108 may be a computing device that is separate from a POS device at the establishment 112.

As described herein, the merchant 114 may include any business or other entity engaged in the offering of items for acquisition by buyers 116 in exchange for compensation received from the buyers 116. Actions attributed to a merchant 114 herein may include actions performed by employees or other agents of the merchant 114 and, thus, no distinction is made between merchants and their employees unless specifically discussed. In addition, as described herein, the buyer 116 may include any entity that acquires items from a merchant 114, such as by purchasing, renting, leasing, borrowing, licensing, or the like. Buyers 116 may include customers or potential customers of a particular merchant 114. Thus, a merchant 114 and a buyer 116 may interact with each other to conduct a transaction in which the buyer 116 acquires one or more items from the merchant 114 and, in return, the buyer 116 provides payment to the merchant 114. For instance, the buyer 116 may acquire the items in advance, e.g., through placement of an order, and the merchant 114 may subsequently present a bill to the buyer 116 as an accounting of the amount owed. Accordingly, as described herein, a bill or bill information may include any tab, check, statement of charges, invoice, or other accounting of an amount owed by a buyer 116 to a merchant 114 for one or more items acquired from the merchant 114.

The buyer 116 may have or may otherwise be associated with the buyer device 110 that executes an instance of a buyer application 122. For example, some buyers 116 may carry buyer devices 110, such as smart phones, tablet computers, wearable computing devices, or the like, as further enumerated elsewhere herein, and some of these buyer devices 110 may have installed thereon the buyer application 122. The buyer application 122 may include electronic payment capability, which enables the buyer 116 to make a payment to the merchant 114 using the buyer application 122, rather than paying with a physical payment card, cash, bill, or other payment instrument. The buyer application 122 may further enable the buyer 116 to place an order for an item 118 in addition to paying for the item 118. The buyer application 122 may also be able to receive and/or interpret location indicator information to enable determination of a current location of the buyer in an establishment 112.

As one example, when the buyer 116 sits at a particular table 124 at the establishment 112, the buyer application 122, if active, may assist in determining at which particular table 124 the buyer 116 is currently located by receiving, from a nearby location indicator 126, location indicator information 128. In some examples, individually distinguishable location indicators 126 may be associated with each respective table 124 or other service position in the establishment 112. As one example, the location indicators 126 may be wireless location indicators such as Bluetooth® low energy (BLE) beacons, which are available from, e.g., Roximity Inc., of Denver Colo., or various other vendors. The wireless beacons may each emit a different individually distinguishable identifier, such as an identification number, or other beacon information, to the local area around the beacon. For example, typical BLE beacons may be tuned to have an effective transmission range from less than 1 meter to approximately 70 meters, with the detectable signal strength decreasing as distance from the beacon increases.

The buyer device 110 may include one or more communication interfaces (not shown in FIG. 1) able to receive the signals from the wireless beacons or other location indicators 126 and provide these signals to the buyer application 122. The buyer application 122 may be able to determine the range to a particular beacon, such as for determining whether the buyer device 110 is closer to a first location indicator 126(1) or a second location indicator 126(2). Thus, based on the wireless signals received from a plurality of location indicators 126, the buyer application 122 can determine a particular location indicator 126 that is in closest proximity to the buyer device 110. Based on the determination of the nearest location indicator 126, the buyer application 122 may provide the received beacon information as location indicator information 128 to the service computing device 102.

Alternatively, the buyer application 122 may be able to access a network resource, such as a website, a URL (uniform resource locator), or the like, that specifies the location of particular beacons based on the beacon information. In such a situation, the location indicator information 128 provided to the service computing device 102 may include a specified beacon location in addition to, or in place of a beacon identifier. Thus, the buyer device 110, the service computing device 102, and/or the merchant device 108, may look up a received beacon identifier to determine a location associated with the particular beacon, depending on where the location information is stored and to whom access is permitted. Further, in other examples, the beacons or other location indicators 126 may emit information other than, or in addition to a beacon identifier. For example, a location indicator 126 may be configured to emit a precise geographical location of the location indicator (e.g., a longitude and a latitude), a particular table number at which the location indicator is located, a service position number (e.g., in the case that service position is based on a location other than a table), an establishment name, an establishment street address, and so forth.

As another example, rather than BLE beacons, radiofrequency identification (RFID) devices and/or near field communication (NFC) devices may be used as the location indicators 126 in some implementations herein. For example, NFC is a set of standards for a subset of RFID devices directed to communication with portable computing devices over short distances (e.g., less than 10 cm); however, implementations herein are not limited to NFC devices. Further, NFC and RFID devices may be active or passive. For instance, an active RFID device may have a power source, and may continually emit a signal with location indicator information to a surrounding area. The location indicator information may include an RFID device ID number, an establishment name, a table number, a service position identifier, or other location indicator information. On the other hand, a passive RFID or NFC device may emit a signal with the location indicator information only when a buyer device 110 is brought within sufficiently close proximity, such as in response to an inductance generated by the buyer device 110. In the case of a passive RFID or NFC device, the buyer 116 may bring the buyer device 110 to within, e.g., several cm of the location indicator 126 to receive the location indicator information 128.

Further, the foregoing are merely several examples of suitable technologies that may be used in some examples herein. For example, the location indicators 126 may operate using any wireless technology, such as WiFi, infrared, radio, cellular technology, and so forth. Additionally, various other technologies that may be used for determining the location of the buyer device without requiring direct input by the buyer will be apparent to those of skill in the art having the benefit of the disclosure herein. For example, each table 124 may include an individual barcode or other readable information that may be scanned or otherwise transmitted to the service computing device 102.

Additionally, in some examples, the buyer device 110 may include a GPS device, and the buyer application 122 may provide the current GPS location of the buyer device 110 to the service computing device 102 to indicate the geographical location of the buyer device 110 in addition to or as an alternative to the location indicator information 128. As one example, the service computing device may use the geographical location of the buyer device 110 to determine the establishment 112 at which the buyer 116 is located. The service computing device 102 may then transmit the location indicator information 128 to the merchant device 108 so that the merchant device 108 may determine a particular table 124 within the establishment 112 at which the particular buyer 116 is located.

The service computing device 102 may include a payment service module 130 that may receive transaction information for processing payments made through the merchant application 120 and/or the buyer application 122. For example, the payment service module 130 may receive transaction information, such as an overall amount of each transaction, a description of items purchased, an amount charged for each item, an amount charged for tax, an amount of gratuity to be added, and so forth. Thus, in some instances, the merchant device 108 may function as a POS device that can receive payments by a variety of payment instruments, including payment cards, checks and cash, as well as enabling electronic payments to be made through the buyer application 122.

The payment service module 130 may communicate with the merchant application 120 to enable the merchant device 108 to receive certain types of payments such as electronic payments or payment card payments. In the case that that a buyer 116 is using the buyer application 122 to pay electronically, any of several techniques may be employed for making electronic payments. As one example, the buyer 116 may establish an account with the service provider 104 through the buyer application 122. For instance, the buyer 116 may link a credit card or other buyer account to the buyer application 122. Subsequently, the buyer 116 may interact with merchants 114 who participate in the payment service offered by the service provider 104, and may use the buyer application 122 to pay for items. When the buyer 116 authorizes a payment for a transaction using the buyer application 122, the service computing device 102 may charge the linked buyer account and may credit a merchant account of the corresponding merchant 114.

As an alternative, when a buyer 116 is paying a bill with a physical payment card, the payment service module 130 may receive the transaction information from the merchant device 108. For example, the received transaction information may include the bill amount and the payment card information. The payment service module 130 may verify that the particular payment card can be used to pay for the transaction, such as by contacting a card clearinghouse computing device or other bank computing device (not shown in FIG. 1). In some examples, the payment service module 130 may redirect payment card information for transactions to an appropriate card clearinghouse computing device, while in other examples, the merchant device 108 may communicate directly with an appropriate card clearinghouse computing device for approving or denying a transaction using a particular payment card for a particular transaction. Additional details of payment processing are discussed below with respect to FIG. 9.

The payment service module 130 may use and/or maintain merchant information 132 and buyer information 134. To accept payments for POS transactions, the merchant 114 typically creates a merchant profile 136 with the service provider 104 by providing information describing the merchant including, for example, a merchant name, contact information, e.g., telephone numbers, the merchant's street address, and one or more financial accounts to which funds collected from buyers will be deposited. Further, the service provider 104 may also associate with the merchant profile 136 additional information about the merchant, such as a record of each transaction conducted by the merchant. In addition, the merchant profile 136 may include item information, such as a listing or other menu of items offered by the merchant and prices associated with each item offered by the merchant. Furthermore, the merchant profile 136 may include a data structure (not shown in FIG. 1) that provides a cross-referencing between location indicator information and service positions at an establishment of the merchant.

For example, the data structure may cross-reference beacon identifiers with particular table locations at the particular establishment.

Further, before conducting an electronic payment transaction, the buyer 116 creates a buyer profile 138 with the service provider 104. The buyer 116 can create the buyer profile 138, for example, by interacting with the buyer application 122. When enabling electronic payments with the service provider 104, the buyer 116 may provide an image including the face of the buyer, data describing a financial account of the buyer 116, e.g., a credit card number, expiration date, and a billing address. Further, the buyer profile 138 may include demographic information about the buyer 116 and a record of transactions conducted by the buyer 116.

The buyer profiles 138 and/or merchant profiles 136 described herein may be created and maintained using any suitable types of data structures, and using any suitable data storage or database techniques. In some examples, the profile information may be maintained in a relational database in which pieces of information for individual buyer profiles and merchant profiles may be stored distinctly from one another, but are related to or otherwise associated with particular profiles in the relational database. For instance, a particular buyer profile 138 may be obtained by generating a view of a portion the data related in the database to the particular buyer profile, or by otherwise extracting the data from the database. Alternatively, of course, other types of storage techniques may be used for generating and maintaining the buyer profiles 138 and/or the merchant profiles 136.

In the illustrated example, suppose that the establishment 112 is a restaurant, and that a first buyer 116(1) is seated at a first table 124(1). Further, suppose that second through fifth buyers 116(2)-116(5) are seated at a second table 124(2), sixth and seventh buyers 116(6)-116(7) are seated at a third table 124(3), and no one is currently seated at a fourth table 124(4). Each table 124(1)-124(4) has a location indicator 126(1)-126(4) that is associated with the respective table 124(1)-124(4). In some examples, the merchant device 108 may maintain a data structure (not shown in FIG. 1), of the associations between respective location indicators 126 and respective tables 124. Additionally, or alternatively, the service computing device may maintain a data structure (not shown in FIG. 1) with the associations between the location indicators 126 and the tables 124. As still another alternative, the associations between the location indicators 126 and the tables 124 may be maintained at a network location such as at a website, URL, or the like.

As one example, a server 140, such as a waitperson, attendant, bartender, or the like, may take an order of the first buyer 116(1) in a conventional manner. For example, the server 140 may provide the first buyer 116(1) with a physical menu (not shown in FIG. 1), and may write down the buyer's order. The server 140 may submit the first buyer's order to an item preparer 142 who prepares an item 118 requested by the first buyer 116(1). When the item 118 has been prepared, the server 140 delivers the item 118 to the first table 124(1).

As the first buyer 116(1) orders one or more items 118, the server 140 may add the one or more items 118 to a tab associated with the first table 124(1) at which the first buyer 116(1) is seated. A first location indicator 126(1) associated with the first table 124(1) may transmit location indicator information 128 that that may be used to identify the particular table at which the first buyer 116(1) is sitting. For instance, the buyer application 122 on the buyer device 110 associated with the first buyer 116(1) may determine the closest location indicator, such as based on a comparison of relative signal strengths of the plurality of location indicators 126(1)-126(4) in the vicinity of the buyer device 110. When the buyer application 122 has determined which location indicator 126 is nearest, the buyer application 122 may transmit the location indicator information 128 received from the nearest location indicator 126(1) to the service computing device 102 over the one or more networks 106.

When the first buyer 116(1) is ready to leave, the first buyer 116(1) can request the bill associated with the first table 124(1) using the buyer application 122 on the buyer device 110 associated with the first buyer 116(1). The location indicator information 128 may have already been transmitted to the service computing device 102 by the buyer application 122, or may be transmitted with the request for the bill.

In response to receiving the request from the buyer application 122, the service computing device 102 sends buyer location information 144 to the merchant device 108. In some examples, the buyer location information 144 may be the same as the location indicator information 128 received from the buyer application. For example, if the service computing device 102 does not have access to information for determining the establishment or the merchant from the location indicator information 128, the service computing device 102 may determine the establishment at which the buyer is located based on GPS information or other location information obtained from the buyer device 110. The service computing device 102 may then match the location information from the buyer device with, e.g., street address information in one of the merchant profiles 136 to determine a particular merchant device to which to send the buyer location information 144. Thus, the merchant device 108 may receive the buyer location information 144 and may determine a particular service position in the establishment, i.e., in this example, table 124(1), corresponding to the first buyer 116(1) for obtaining the correct bill for the first buyer 116(1).

In other examples, the service computing device 102 may refer to a data structure (not shown in FIG. 1) that indicates the association between the location indicator information 128 and particular tables at the particular establishment 112. For instance, the service computing device 102 may maintain a listing of all location indicator ID numbers for all merchants participating in the payment service provided by the service provider 104. In response to receiving the location indicator information 128, the service computing device 102 may refer to the listing to determine a particular establishment at which the buyer is located, and in some cases a particular table or other service position. In this case, the service computing device 102 may send an actual table identifier or other service position identifier to the merchant device 108, rather than, for example, a location indicator ID number. Furthermore, if a data structure relating the location indicator ID numbers with physical locations is available at a network location, such as a URL, then the buyer application 122 and/or the service computing device 102 may obtain the physical location information directly from the network location.

As still another alternative, if the location indicator 126 emits a signal with location indicator information 128 that includes an identifier of the particular table and an establishment location, then the service computing device 102 may simply use the location indicator information 128 to determine the correct merchant device 108 to which to send this information as the buyer location information 144.

Further, various other techniques for relating the location indicator information received by the buyer device to a particular location in the establishment will be apparent to those of skill in the art having the benefit of the disclosure herein.

Based at least in part on the buyer location information 144 received from the service computing device 102, the merchant application 120 may determine a bill corresponding to the received buyer location information 144. For instance, the merchant device may determine that the received buyer location information 144 corresponds to the first table 124(1) and may identify an open tab corresponding to the first table 124(1). Thus, the merchant application 120 may close out and total up the tab to determine the amount due to be paid by the first buyer 116(1), and may provide the total amount due with bill information 146 sent to the service computing device 102. The payment service module 130 may send the bill information 146 to the buyer application 122 associated with the first buyer.

The buyer application 122 may present the bill information on a display of the buyer device 110, such as in a user interface (not shown in FIG. 1). In some examples, the bill information 146 may include a listing of each item ordered, a price for each item, taxes, added gratuity, if any, and a total amount owed. The first buyer 116(1) may interact with the user interface to review the bill information 146, add or edit a gratuity, and authorize payment of the bill. For instance, as discussed additionally below with respect to FIGS. 2A, 2B and 3, the buyer application 122 may present a user interface that enables entry of a gratuity amount and a signature, and the buyer may select whether to have a receipt emailed or to not receive a receipt.

In response to receiving a payment authorization 148 or other payment instruction from the buyer device 110, the payment service module 130 may charge the payment amount to an account of the first buyer 116(1), such as by charging a credit card previously linked to the first buyer's electronic payment account. Furthermore, the payment service module 130 may credit an account of the merchant 114 by an amount based on the payment provided by the buyer 116(1) through the buyer application 122. In addition, the payment service module 130 may send a notification to the merchant application 120 to notify the merchant 114 that the bill corresponding to the first table 124(1) has been paid. For example, the merchant application 120 may present, on a display associated with the merchant device 108, a message that the bill for the first table 124(1) has been paid.

As an alternative, rather than employing in-application communications between the buyer application 122 and the payment service module 130 for delivering the bill information 146 to the buyer device 110, the bill information 146 may be provided to the buyer device 110 using other techniques such as by email, a short messaging service (SMS) message, a multimedia messaging service (MMS) message, an instant messaging service message, or by other electronic communication. For instance, if the bill information 146 is sent by email, the first buyer 116(1) may provide an instruction for payment by sending a reply email to the payment service module 130. Bills sent by SMS, MMS or instant messaging may be similarly authorized to be paid by a reply communication from the buyer device 110.

Association of a particular buyer 116 with a tab open at a particular table or other service position may take place when the buyer 116 first arrives at the establishment 112, when the buyer 116 is ready to depart from the establishment 112, or at a time in between. As one example, the buyer 116 may elect to pay using the buyer application 122 at the end of the meal. For example, when the buyer 116 is ready to leave, the buyer may pull out or otherwise access the buyer device 110, open the buyer application 122, and select a virtual control to send a request to pay a bill. The buyer application 122 automatically determines the nearest location indicator 126, and includes the corresponding location indicator information 128 with the request to pay the bill. The payment service module 130 obtains the bill for the buyer application, and the buyer application 122 presents the bill on the display of the buyer device 110 for completion and payment as discussed above.

Additionally, in some examples, a buyer 116 may place an order using the buyer device 110. The buyer application 122 may send the order to the payment service module 130, and the payment service module 130 may forward the order to the merchant device 108 along with buyer location information 144. As an example, suppose that the second through fifth buyers 116(2)-116(5) are seated at the second table 124(2), and that the second buyer 116(2) orders one or more items 118 for the group using the buyer application 122 on the buyer device 110 associated with the second buyer 116(2). In this example, a menu may be presented on the buyer device 110. In some examples, the service computing device 102 may have acquired the menu of the merchant 108 in advance and may maintain the menu in association with the merchant profile 136 for the particular merchant 114. In other examples, the service computing device 102 may obtain the menu from the merchant device 108 in response to receiving the request from the buyer device 110 associated with the second buyer 116(2). In addition, the buyer device 110 may send location indicator information 128 from the second location indicator 126(2) to the service computing device 102 with the request for the menu and, in some examples, may send this information again with an order.

The buyer application 122 may present the menu of the establishment 112 on the display of the buyer device 110 associated with the second buyer 116(2). The second buyer 116(2) may select one or more items from the menu, and may select a virtual control to cause the buyer application 122 to send the selections as an order to the service computing device 102. In some examples, the buyer application may also resend the location indicator information 128 from the second location indicator 126(2), such as to ensure that the second buyer 116(2) has not changed tables or otherwise moved to a different service position. The service computing device 102 may send the order and the buyer location information 144 to the merchant device 108, and the merchant application 120 on the merchant device 108 may provide the order to the item preparer 142. Additionally, or alternatively, the server 140 may review the order and provide the order to the item preparer 142. When one or more items 118 from the order have been prepared, the server 140 may deliver the one or more items 118 to the second table 124(2). For example, the merchant device may have determined from the buyer location information 144 that the second table 124(2) is associated with the received order. When the buyers 116(2)-116(5) are ready to depart from the establishment 112, the second buyer 116(2) may open the buyer application 122 to request the bill, and the second buyer 116(2) may pay the bill in a manner similar to that discussed above.

In some cases, when one of the buyers pays for a group of buyers associated with a particular bill, the group of buyers may intend to divide and share the bill among multiple parties. For instance, as discussed additionally below, the buyer application may include an option for the buyer to share the bill with one or more other buyers in the group. As one example, the paying buyer may select the particular items to be paid for by the other buyers. Alternatively, the buyer application 122 may provide an option to divide equally the bill by the number of buyers in the group. The buyer application 122 may then determine the amount of the bill to be paid by each buyer, which may include a share of the tip and tax.

In some examples, the buyer application 122 may provide a user interface for the paying buyer to enter or select contact information for the buyers that will share the bill. The buyer application 122 may automatically send a reimbursement request to each buyer that is a sharing party to request payment of the amount owed by that party, such as through a peer-to-peer payment module. Accordingly, the buyer application may send a request for the amount using the peer-to-peer payment module, and the sharing parties may reply to the request by using the peer-to-peer modules on their own buyer devices to provide payment to the paying buyer in the amount of their share of the bill. Alternatively, of course, the parties sharing the bill may pay the paying buyer at the time of bill payment, such as with cash or other suitable payment methods.

As another example, suppose that the sixth buyer 116(6) and the seventh buyer 116(7) are eating together at the same table, i.e., the third table 124(3) in the example illustrated in FIG. 1. Each buyer 116(6) and 116(7) may use his or her own buyer device 110 to order and pay separately. Accordingly, the sixth buyer 116(6) may order one or more items 118 using the buyer application 122 on the buyer device 110 associated with the sixth buyer 116(6). Similarly, the seventh buyer 116(7) may order one or more items 118 using the buyer application 122 on the buyer device 110 associated with the seventh buyer 116(7). Thus, the bill for the sixth buyer 116(6) and the bill for the seventh buyer 116(7) may both be associated with the location indicator 126(3) and thereby with the table 124(3) using the techniques discussed above. When the buyers 116(6) and 116(7) are ready to depart, they may each use their own buyer device 110 to receive and pay for their own bills.

In some examples, the server 140 may use a mobile implementation of the merchant device to take the orders of the buyers 116. For example, a mobile merchant device 108(m) may be carried by the server 140 when taking orders from buyers 116, and the mobile merchant device 108(m) may include an instance of the merchant application 120 (not shown in FIG. 1). The mobile merchant device 108(m) may include a communication interface configured to receive location indicator information from the location indicators 126 corresponding to various tables or other service positions at the establishment 112. As one example, when the server 140 takes the order of, e.g., the first buyer 116(1), the merchant application on the mobile merchant device 108(m) may determine that the location indicator 126(1) is currently the closest location indicator. This determination may be made based on a comparison of relative signal strengths of the location indicators 126 in the vicinity of the mobile merchant device 108(m), or other suitable techniques, as discussed above. Based on this determination, the merchant application may automatically associate the location indicator information received from the first location indicator 126(1) with the order that the server 140 is currently entering into the mobile merchant device 108(m).

Additionally, the merchant application on the mobile merchant device 108(m), or on another merchant device 108, may relate the received location indicator information with a particular table number, service position identifier, or the like, such as by referring to a data structure relating location indicator information with physical service positions, as discussed above. Thus, the particular order may be associated with particular location indicator information and/or a particular physical service position. For instance, the server 140, or another server at the establishment, may refer to the particular order to determine the service position to which to deliver the ordered item(s). Further, when the merchant device 108 or 108(*m*) receives a request to provide the bill for the order, e.g., from the service computing device 102 or directly from the buyer device 110, the merchant device 108 or 108(*m*) may retrieve the corresponding bill information based on at least one of the location indicator information or an indication of a physical service position.

In addition, in still another example, the server 140 may use the mobile merchant device 108(*m*) to take the buyer's order, and the server 140 may manually enter a table number or other physical service position identifier. The merchant application 120 may associate the entered service position identifier with the order, and may access a data structure to determine the corresponding location identifier. Accordingly, the physical service position associated with the order may be cross-referenced to a particular location identifier. Subsequently, when the merchant device 108(*m*) or another merchant device 108 at the establishment 112 receives a request for the bill and location identifier information from the service computing device 102, the merchant device may identify the bill based on the received location identifier information.

As still another example, rather than receiving and paying the bill in the establishment, a buyer 116 may simply walk out of the establishment 112 and the payment service module 130 may have been pre-authorized by the buyer 116 to pay the bill on behalf of the buyer 116. For instance, the bill may be automatically charged to the particular buyer's electronic account, such as with a standard gratuity. Furthermore, a receipt may be sent to the buyer device associated with the buyer, such as by email, text message, in-application communication, or the like. As an example, one or more location indicators 126(5) may be placed near an exit 150 of the establishment 112. The buyer application 122 may have already provided location indicator information 128 to the service computing device 102 for associating a particular service position and a particular bill with the buyer profile 108, such as by the buyer placing an order that is associated with a particular location indicator 126. Accordingly, when the buyer passes by the location indicator 126(5) near the exit 150, the buyer application 122 may send this location indicator information to the service computing device 102, which may determine that the particular buyer 116 has departed from the establishment 112. As a result, the payment service module 130 may obtain the corresponding bill information 146 from the merchant application 120, add a default or predetermined gratuity, which may have been preapproved by the buyer, charge the bill to the buyer's account, credit the account of the merchant, and send a notification to the merchant device 108 indicating that the bill has been paid.

In addition, while beacon type location indicators cannot directly indicate if an associated table is occupied, the merchant device 108 is able to make this determination in some examples indirectly. As an example, in the case that the buyers use the buyer device to place orders, the merchant is able to determine which tables are occupied by determining which tables currently have open tabs. Accordingly, a buyer planning to patronize an establishment may request from the service provider an indication of current availability of tables at the particular establishment. For instance, the buyer may be able to determine whether a particular table that the buyer prefers is currently occupied, and may send a request to the merchant to request that the table be reserved if the table is currently unoccupied. Numerous other variations will be apparent to those of skill in the art having the benefit of the disclosure herein.

Figure 2A:
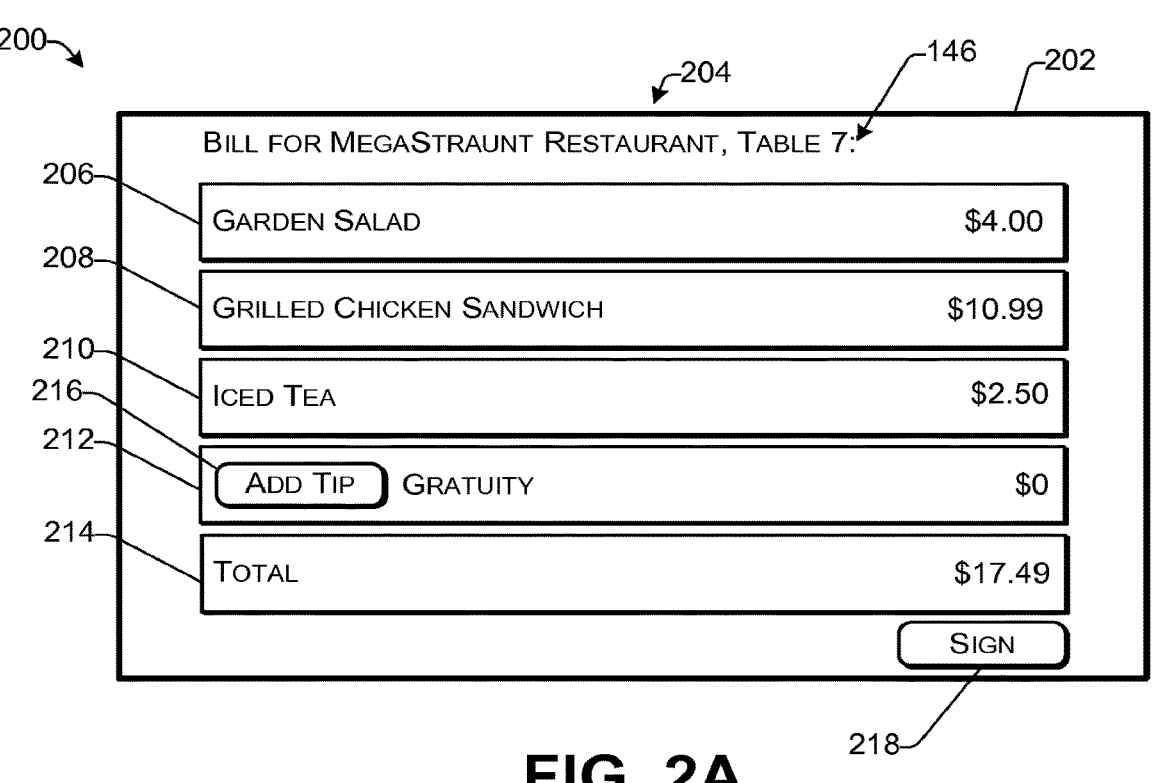
FIGS. 2A and 2B illustrate example user interfaces for enabling location-based payments according to some implementations.
Figure 2B:
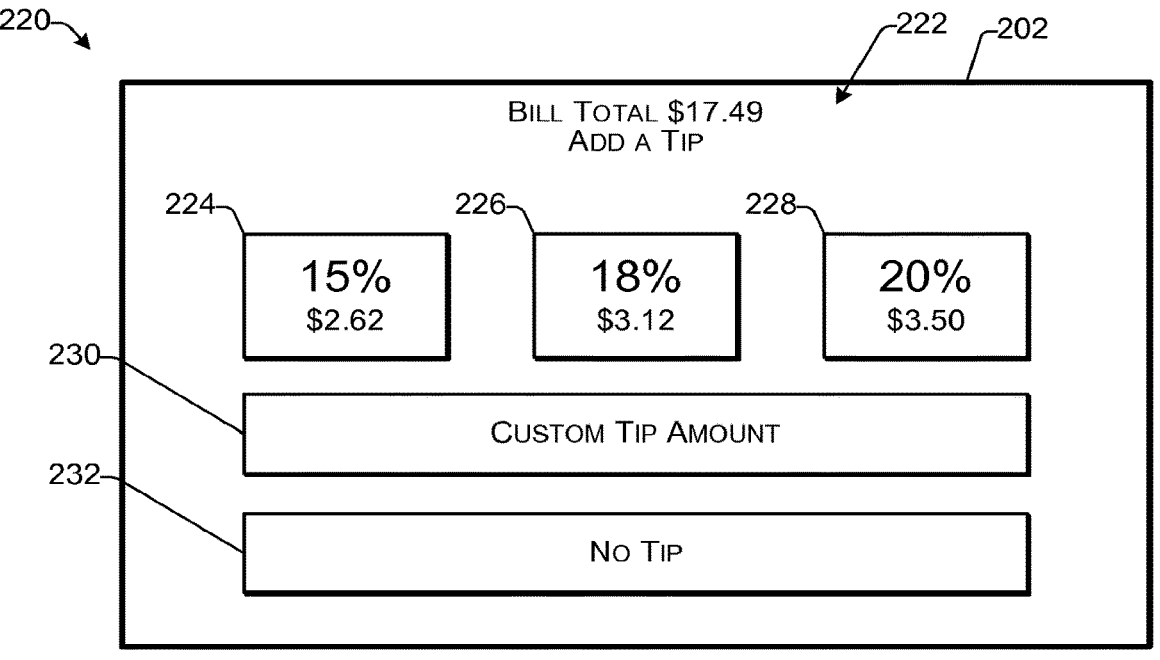

FIGS. 2A and 2B illustrate example user interfaces for enabling location-based payments according to some implementations. FIG. 2A illustrates an example user interface 200 presented on a display 202 associated with a buyer device 110. The user interface 200 and other user interfaces discussed herein are illustrated for use with a touch input device and, accordingly, the display 202 may include a touch sensor (not shown in FIG. 2A). However, other types of user interfaces may be used with the examples herein and, accordingly, the examples herein are not limited to any particular type of user interfaces or user input devices.

In the illustrated example of FIG. 2A, the buyer application presents bill information 146 in the user interface 200, such as in response to receiving the bill information 146 from the service computing device, as discussed above. The bill information 146 may include the name of the restaurant, the table number, and a listing 204 of items ordered and associated prices for each item. In this example, the bill information 146 includes a listing of three items, namely, a garden salad 206, a chicken sandwich 208, and an iced tea 210, along with the price for each item ordered by the buyer. Further, in this example, the taxes may have been already been added into the price associated with each item 206-210. In other examples, however, the individual taxes for each item, or total tax for all of the items may be listed separately in the listing 204.

In addition, the listing 204 includes a gratuity amount 212 and a total amount 214 of the bill. In this example, the gratuity amount 212 has not been yet been determined or included in the total amount 214 of the bill. In other examples, the buyer may designate a default gratuity that may be automatically included in each bill paid. Additionally, in some examples, the merchant may include an added gratuity with the bill information 146. To enable the buyer to add a desired gratuity amount to the bill total 214, the gratuity listing 212 includes a virtual control 216, such as a selectable virtual button, or the like, that the buyer may tap on, click on, or otherwise select to enable a gratuity amount to be selected and added to the bill total. In addition, the user interface 200 may include a virtual control 218 that the buyer may select when the buyer is ready to sign and authorize payment of the bill.

FIG. 2B illustrates an example user interface 220 that may be presented by the buyer application in response to the buyer selecting the virtual control 216 for adding a gratuity to the bill. For instance, the user interface 220 may show the current transaction total 222, and may present a plurality of virtual controls 224-232 that the buyer may interact with to select a desired tip amount to be added to the bill total. In this example, the user interface 220 includes three virtual controls 224, 226 and 228 for selecting a standard tip amount such as 15%, 18% and 20% respectively. Each of these virtual controls may further show the calculated amount of gratuity that will be added to the bill total if the buyer selects that virtual control 224-228. In addition, the user interface 220 includes a virtual control 230 that the buyer may select to add a custom tip amount. For example, if the buyer selects a virtual control 230 a virtual keypad may be presented that enables the buyer to enter a number to be added as the gratuity to the bill. In addition, the user interface 220 includes a virtual control 232 which the buyer may select if the buyer desires to not include any gratuity in the bill, such as in the case that the buyer already provided or intends to provide a cash gratuity to the server.

When the buyer has finished selecting a desired gratuity, the user interface 200 may again be presented with the added gratuity shown in the listed gratuity amount 212. Further, the bill total 214 may be updated to include the added gratuity amount. When the buyer has finished reviewing the bill information 146 and adding the gratuity, the buyer may select the virtual control 218 to sign and authorize or otherwise instruct payment of the bill.

Figure 3:
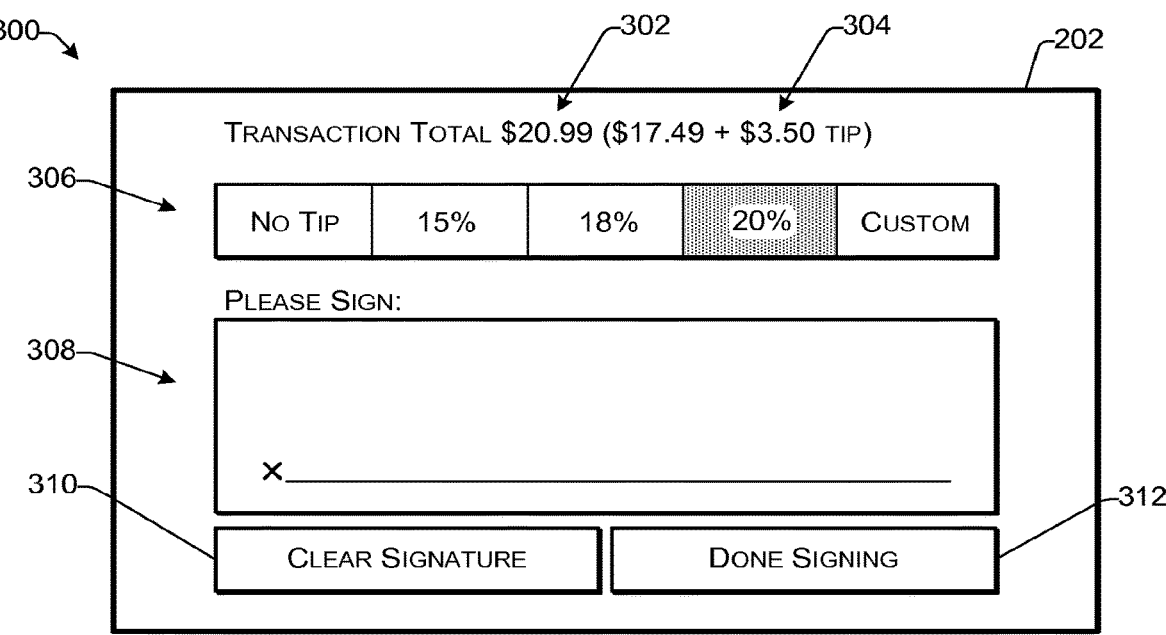
FIG. 3 illustrates an example user interface for enabling location-based payments according to some implementations.

FIG. 3 illustrates an example user interface 300 that may be presented on the display 202 in response to the buyer selecting the virtual control 218 in the interface 200. In this example, the user interface 300 includes the transaction total 302 and a breakdown 304 of the transaction total, such as the amount of the total that is for the items and taxes, and the amount that is for the gratuity. Further, the user interface 300 may indicate, as shown at 306, the amount of the gratuity selected by the user, such as by highlighting the selected gratuity option, e.g., 20% in this example. Additionally, in some cases, the user may still change the gratuity amount by selecting one of the other options presented at 306 in the user interface 300.

In addition, the user interface 300 includes a signature area 308 that may enable the buyer to enter a signature electronically as authorization for payment of the bill. For example, the buyer may use a finger, stylus, or other input device to enter a signature in the signature area 308. A "clear signature" virtual control 310 and a "done signing" virtual control 312 may be associated with the signature area 308. For example if the buyer wishes to reenter the electronic signature, the buyer may select the virtual control 310 to clear a previously entered signature. When the buyer has finished entering a signature, the buyer may select the "done signing" virtual control 312 to authorize or otherwise instruct payment of the bill. Thus, when the buyer is finished signing, and selects the virtual control 312, the buyer application may send the electronic version of the buyer's signature to the service computing device as payment authorization 148 discussed above with respect to FIG. 1. In response, the service computing device may charge the payment to the account of the buyer and may credit an account of the merchant. In addition, in other examples, the buyer may authorize or otherwise send an instruction to pay the bill amount using any other suitable interface, input controls, or the like.

Figure 4A:
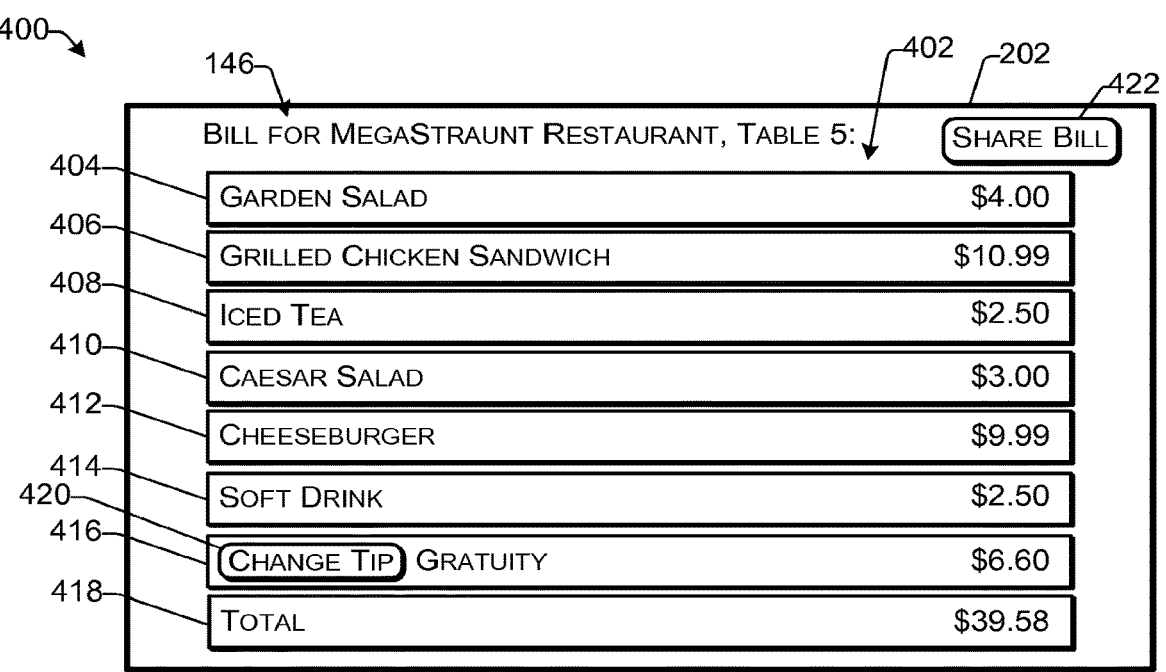
FIGS. 4A and 4B illustrate example user interfaces for enabling location-based payments according to some implementations.
Figure 4B:
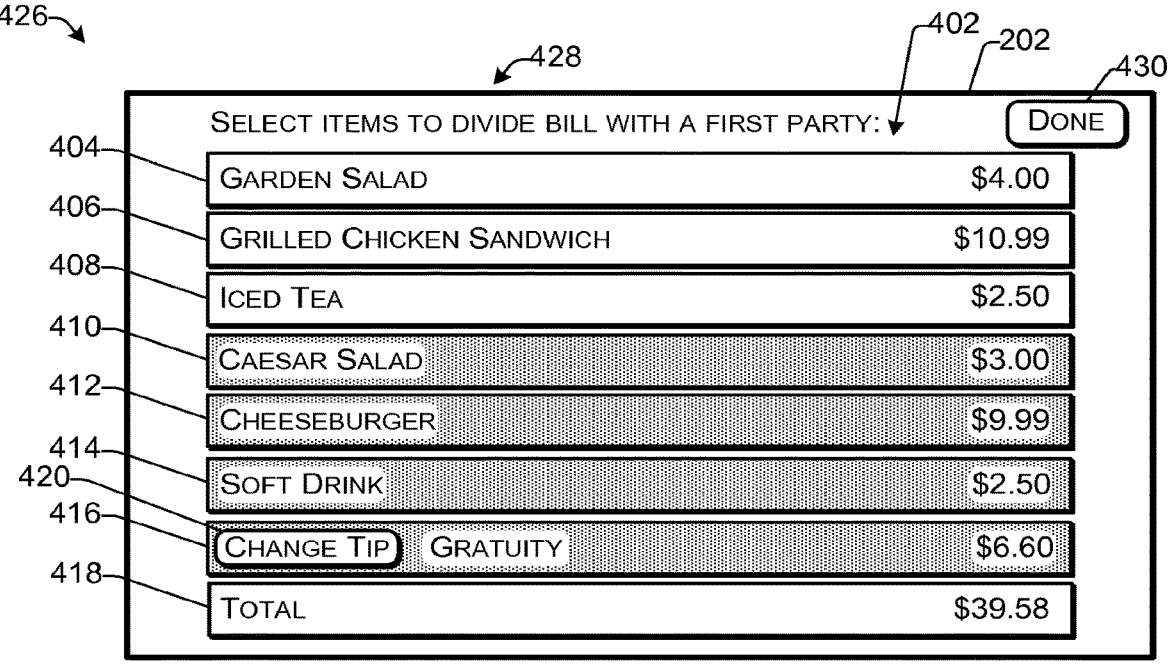
Figure 5:
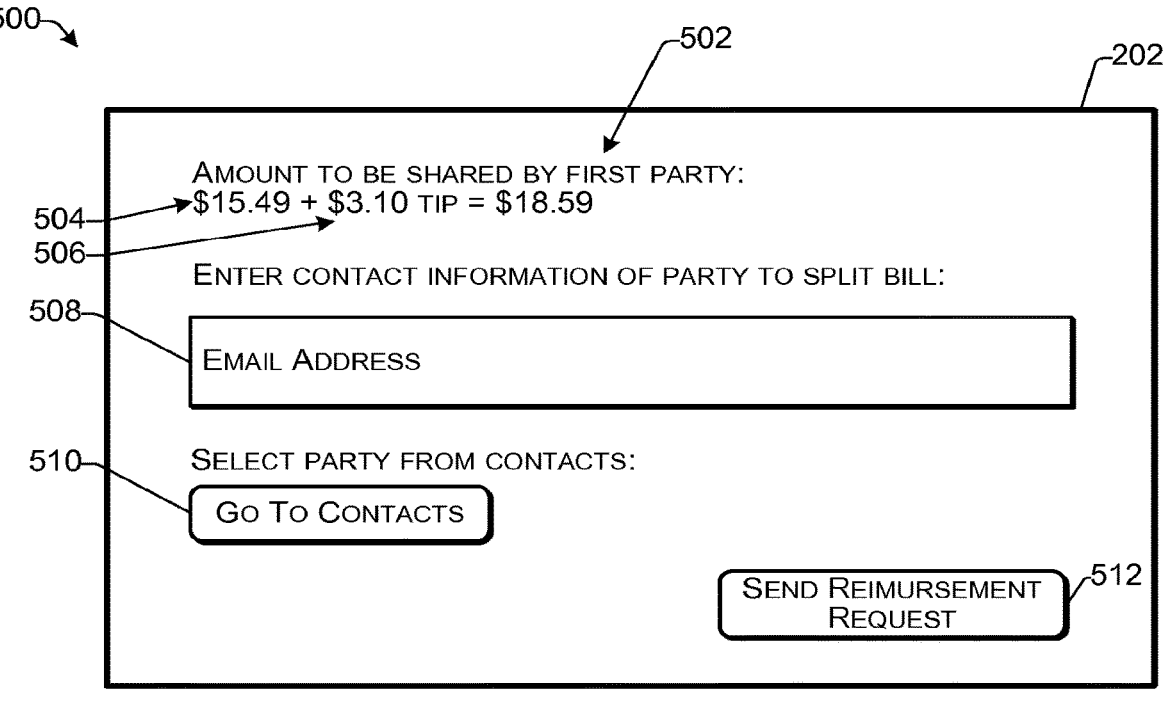
FIG. 5 illustrates an example user interface for enabling location-based payments according to some implementations.

FIGS. 4A, 4B and 5 illustrate example user interfaces that may be presented on the buyer device when a paying buyer desires to share a bill among multiple buyers. For instance, as discussed above with respect to FIG. 1, in some examples, a single buyer may pay the bill for a group of buyers, and other buyers in the group may reimburse the paying buyer for their share of the bill. In some examples, the buyers in the group may decide to simply divide the bill equally by the number of sharing buyers in the group. In other examples, as illustrated in FIGS. 4A and 4B, the buyer application may enable the buyers to specify which items will be paid for by which buyers in the group. Furthermore, the division of the bill may take place before the paying buyer sends an instruction for payment of the bill, as discussed above with respect to FIGS. 2A, 2B and 3, or may take place any time thereafter.

FIG. 4A illustrates an example user interface 400 that may be presented on the display 202 of the buyer device according to some implementations. In this example, the user interface 400 presents the billing information 146 in a manner similar to that discussed above with respect to FIG. 2A. Accordingly, the user interface 400 includes a listing 402 of the items ordered, which in this example include listed items 404-414. Furthermore, the user interface 400 includes a listed gratuity amount 416, and a listed total amount 418. Additionally, while the virtual control 218 for signing to authorize payment of the bill is not shown in this example, the virtual control 218 may be accessed, such as by scrolling the presented listing 402, or the like.

In the illustrated example, suppose that a gratuity amount has already been added to the bill e.g., by the buyer, by the buyer application, or by the merchant. Therefore, a virtual control 420 is selectable if the buyer desires to change the gratuity amount, rather than for initially entering the gratuity amount as discussed above with respect to FIGS. 2A and 2B. Furthermore, the user interface 400 includes a virtual control 422 that may be selected by the paying buyer to divide or otherwise share the bill among multiple parties.

FIG. 4B illustrates an example user interface 426 that may be presented on the display 202 in response to the buyer selecting the virtual control 422 to share the bill. The user interface 426 may include an instruction 428 instructing the buyer to select the items that are desired to be shared with a first party that is sharing the bill. Accordingly, the paying buyer may select one or more items in the listing 402 to share with the first party, and may repeat the process for any additional parties.

In the example of FIG. 4B, suppose there is only one party with which the paying buyer will be dividing the bill. As illustrated, the paying buyer has selected items 410, 412, 414 and the gratuity 416 to be shared by the other party. For example, the paying buyer may select these items 410-416, such as by tapping on the particular items or by using other suitable selection techniques. When the paying buyer has finished selecting the items 410-416 to divide with the other party, the paying buyer may select a "done" virtual control 430 to indicate that the buyer has finished selecting the items to be paid for by the first party. The buyer application may present another instance of the user interface 426 to enable the paying buyer to select items to be shared by a second party, and so forth. However, if the buyer selects the "done" virtual control 430 without selecting any additional items then the buyer application may present the user interface discussed below with respect to FIG. 5.

FIG. 5 illustrates an example user interface 500 that may be presented on the display 202 to enable the paying buyer to identify the parties that will share the bill with the paying buyer. For instance, the user interface 500 may include a total amount 502 to be shared by the first party, and may further include a breakdown of the amount of the items 504 and the amount of the gratuity 506 that is being shared by the first party. For instance, the amount of the gratuity 506 may be determined based on a pro rata amount of the overall bill or by other suitable techniques.

In addition, the user interface 500 may include a contact information entry area 508 in which the paying buyer may enter an email address or other contact information that may be used to obtain reimbursement from the parties that are sharing the bill. For example, the paying buyer may use a peer-to-peer payment module that may be part of the buyer application or another application able to be executed on the buyer device 110. Accordingly, the buyer application may provide the contact information to the peer-to-peer payment module (not shown in FIG. 5), and the peer-to-peer payment module may automatically send a request for reimbursement to the contact information. In some examples, the peer-topeer payment module may rely on email addresses for peer-to-peer payments, while in other examples, other types of contact information for other types of electronic communications, such as text messages, instant messages, or the like, may be used.

In some examples, the buyer may tap on the contact information entry area 508 to have a virtual keyboard presented for manual entry of the contact information of the other party. As another example, the buyer may select a virtual control 510 to select the sharing party's contact information from contact information already present on the buyer device 110, such as in a list of contacts maintained on the buyer device 110. When the contact information for the first party has been entered, the buyer may select a virtual control 512 to send the reimbursement request to the first party. Reimbursement requests for additional parties may be entered in a similar manner Selection of the virtual control 512 to send the reimbursement request may result in the peer-to-peer payment module sending an electronic communication to the contact information entered for the first party. For example, the paying buyer may have previously linked the peer-to-peer payment module with a debit card associated with a financial account of the paying buyer. When the sharing buyer receives the electronic communication, if an instance of the peer-to-peer payment module is already installed on the sharing buyer's device, the sharing buyer may respond by sending the requested amount back to the paying buyer. In some examples, the reply from the sharing buyer may cause the money to be deposited directly into the paying buyer's account based on the previously received debit card information. On the other hand, if the sharing buyer does not have the peer-to-peer payment module already installed on the sharing buyer's device, the email may provide a link for the sharing buyer to install the peer-to-peer payment module, link the peer-to-peer payment module to a financial account of the sharing buyer, such as through a debit card number, and the sharing buyer may then send the reimbursement amount to the paying buyer for automatic deposit into the bank account of the paying buyer. Furthermore, while the peer-to-peer module discussed herein is one example of a way for the paying buyer to be reimbursed, various other suitable techniques will be apparent to those of skill in the art having the benefit of the disclosure herein.

FIGS. 6-8 are flow diagrams illustrating example processes for enabling electronic bill payment according to some implementations. The processes of FIGS. 6-8 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the processes, or alternative processes, and not all of the blocks need be executed. For discussion purposes, the processes are described with reference to the environments, architectures and systems described in the examples herein, although the processes may be implemented in a wide variety of other environments, architectures and systems.

FIG. 6 illustrates an example process 600 for enabling a buyer to make electronic payment of a bill based at least in part on a location of the buyer according to some implementations. In some examples, the process 600 may be executed by one or more processors of the service computing device 102 associated with the service provider 104, or by other suitable computing device.

At 602, the computing device may receive location indicator information with a request from a buyer device. For example, the buyer device may be used to send a request to order an item from an establishment, or the buyer device may be used to send a request to pay a bill from the establishment. The location indicator information may be wireless beacon information or other location information received from the buyer device. In some examples, the location indicator information may be provided to the service computing device by the buyer device without any manual entry of location information on the part of the buyer.

At 604, the computing device may determine a merchant profile corresponding to the location indicator information. For instance, the service computing device may look up the location indicator information in a data structure maintained by the service computing device or maintained, for example, at a URL or other network location.

At 606, the computing device may determine whether the request received from the buyer device is for placing an order or for obtaining a bill to be paid. For example, the buyer application may send the request and may indicate whether the request is for ordering an item or for obtaining a bill.

At 608, when the request is for placing an order with an establishment, the computing device may obtain a menu associated with the establishment. In some examples, the menu may have been obtained from the merchant device in advance by the merchant device such as when the merchant signed up to use the payment service offered by the service provider. In other examples, the service computing device may obtain the menu from the merchant device in response to receiving the request from the buyer device.

At 610, the computing device may send the menu to the buyer device. For example, the service computing device may send an electronic version of a menu to the buyer device, and the menu may be presented by the buyer application on the buyer device.

At 612, the computing device may receive, from the buyer device, an order for an item. For example, a buyer using the buyer device may request an order for an item and the buyer application may send the request to the service computing device.

At 614, the computing device may provide the order to the merchant device in association with the location indicator information. For example, the service computing device may have stored the previously received location indicator information in association with the buyer device, or the service computing device may again receive the location indicator information with the order received from the buyer device. In either event, the service computing device may provide the request received from the buyer device to the merchant device, and may further provide buyer location information to the merchant device with the request so that the merchant device can associate the buyer's order with a service position at the establishment based on the indicated buyer location. Accordingly, the merchant device is able to provide the order to a server or an item preparer at the establishment, and the ordered item may be delivered to the buyer location at the establishment based on the determined service position.

At 616, when the request received by the computing device is a request for a bill, the computing device may provide buyer location information associated with the request to the merchant device along with a request to receive the associated bill.

At 618, the computing device may receive the bill from the merchant device in response to the request. For example, based on the provided buyer location information, the merchant device determines a service position and a tab associated with the service position, closes out the tab, and provides the bill information to the service computing device.

At 620, the computing device may send the bill information received from the merchant device to the buyer device. For example, the buyer device may receive the bill information and present the bill information to the buyer in a user interface on a display associated with the buyer device.

At 622, the computing device may receive payment authorization from the buyer device for paying the bill. For example, the service computing device may receive an electronic version of the buyer's signature or other authorization or instruction from the buyer indicating the buyer's instruction to pay the bill. Further, the payment instruction may include a total amount to be paid, which may include a gratuity added by the buyer.

At 624, the computing device may charge an account associated with the buyer for the amount of payment authorized by the buyer, and may credit an account associated with the merchant based on the amount authorized by the buyer. For example, the service computing device may charge a credit card account or other payment account that the buyer has previously associated with the buyer application. In addition, the service computing device may maintain a log of payments received by the merchant and credited to the account of the merchant. In some examples, the amount credited to the account of the merchant may be reduced based on a fee charged by the service provider for the payment service. On a periodic basis, such as daily, etc., the service provider may total up the amounts credited to the merchant account, and may transfer a payment from an account associated with the service provider to the account associated with the merchant.

At 626, the computing device may send a payment confirmation to the merchant device. For example, the merchant device may present confirmation of payment on a display associated with the merchant device.

FIG. 7 is a flow diagram illustrating an example process 700 for enabling a buyer to order an item and pay a bill using a buyer device according to some implementations. In some examples, the process may be executed by the merchant device, or by one or more other suitable computing devices.

At 702, the computing device receives buyer location information and an order for an item. For example, the merchant device may receive buyer location information and an order for an item from a service computing device. Alternatively, in some cases, the buyer device and merchant device may be able to communicate directly with each other, and in such cases, the merchant device may receive the buyer location information and the order directly from the buyer device. As another alternative, the order may be taken by a server using a mobile merchant device. The mobile merchant device may receive location indicator information from a nearest location indicator that is associated with the table or other service position at which the buyer is located when the server takes the order. The mobile merchant device may automatically associate the location indicator information with the current order. As still another alternative, the server may manually enter a service position identifier, such as a table number, into the merchant device when taking the buyer's order.

At 704, the computing device may determine a service position corresponding to the buyer location. For example, in the case that the merchant device receives location indicator information, such as a beacon ID, the merchant device may refer to a data structure to determine the service position corresponding to the received buyer location information. In other examples, the buyer location information may already include a specified service position, such as a particular table at the establishment of the merchant.

At 706, the computing device may add the item to a tab for the service position and provide the order to an item preparer at the establishment. For instance, the merchant device may maintain an open tab for the service position and may receive any number of orders from a buyer associated with the service position. The merchant device may provide each order to one or more item preparers at the establishment, and when the items are prepared, a server may deliver the items to the service position, such as for consumption by the buyer.

At 708, the computing device may receive buyer location information and a request for a bill. For example, when the buyer is ready to leave the establishment, the buyer may request a bill associated with the service position at which the buyer is located.

At 710, in response to receiving the request for the bill, the computing device may determine a service position corresponding to the received buyer location information. For example, as mentioned above, the merchant computing device may refer to a data structure for determining the service position corresponding to the buyer location information.

At 712, the computing device may determine bill information corresponding to the service position. For example, the merchant device may identify an open tab corresponding to the service position, may determine a total number of items for the bill, and may determine a total amount to be charged for the items.

At 714, the computing device may send the bill information to a computing device that requested the bill information. In some examples, the merchant computing device may send the bill information to a service computing device, which sends the bill information to the buyer device. In other examples, the merchant device and the buyer device may be able to communicate directly with each other and, in such cases, the merchant device may send the bill information directly to the buyer device.

At 716, the computing device may receive an indication of payment for the bill. For instance, in some examples of the buyer may send a payment authorization to the service computing device, the service computing device charges an account associated with the buyer profile, credits an account associated with the merchant profile, and sends a notification to the merchant device that the bill has been paid.

FIG. 8 is a flow diagram illustrating an example process 800 for enabling a buyer to pay a bill based at least in part on a location of the buyer according to some implementations. In some examples, the process may be executed by the buyer device or by another suitable computing device.

At 802, the computing device sends, to a service computing device associated with a service provider, a request for a menu of an establishment, the request including location indicator information. For example, the buyer application on the buyer device may receive location indicator information from a location indicator that is nearest to the buyer device. The buyer application may present a user interface to enable the buyer to request a menu for a current location, and the buyer application may automatically send the location indicator information with the request for the menu. Additionally, or alternatively, other location information may be included with the request such as GPS location information obtained from a GPS device on the buyer device, or the like.

At 804, the computing device may receive the menu of the establishment from the service computing device. For example, based on the location indicator information, the service computing device may determine an establishment corresponding to the current location of the buyer, and may retrieve a menu of the establishment. Alternatively, in the case that the buyer device is able to communicate directly with the merchant device, the menu may be received by the buyer device directly from the merchant device.

At 806, the computing device may send a selection of an item to the service computing device. For example, the menu may be presented in a user interface on the buyer device, the buyer may select one or more items order, select a send button or other virtual control, and the order may be sent to the service computing device, which forwards the order to the merchant device at the establishment at which the buyer is currently located. Alternatively, in the examples in which the buyer device is able to communicate directly with the merchant device, the order may be sent directly to the merchant device. Further, in some examples, when the order is sent, the location indicator information may also be sent with the order as an indication of the current location of the buyer at the establishment.

At 808, the computing device may send a request for a bill, and the request may include the location indicator information. For example, when the buyer is ready to depart from the establishment, the buyer may open a user interface provided by the buyer application to request a bill. The buyer application receives location indicator information from a nearest location indicator and includes this information with the request for the bill. For instance, the buyer application may send the request for the bill to the service computing device, which forwards the request and the buyer location information to the merchant device at the establishment. In other examples, the buyer device may be able to send the request for the bill directly to the merchant device along with the location indicator information.

At 810, the computing device may receive bill information in response to the request. For example, the bill information may include a listing of items ordered and an amount owed by the buyer for the items order. As one example, the merchant device may send the bill information to the service computing device, which forwards the bill information to the buyer device. As another example, if the merchant device is able to communicate directly with the buyer device, the merchant device may send the bill information directly to the buyer device.

At 812, the computing device may present a user interface including the bill information. For example, the buyer application may present the bill information in a user interface to enable the buyer to review the bill, add a gratuity, and provide a payment authorization for payment of the bill.

At 814, the computing device may send, to the service computing device, authorization for payment of the bill. For example, the buyer application may send an electronic signature or other authorization of the buyer to the service computing device, which charges an account associated with the buyer profile for the payment amount and which credits an account associated with the merchant profile for an amount based on the payment amount.

At 816, the computing device may present a user interface to enable selection of one or more items for sharing the bill. For example, if the buyer desires to share the bill with one or more other parties, the buyer may select a virtual control to cause the buyer application to present a user interface to enable the buyer to select one or more items for dividing the bill.

At 818, the computing device may receive a selection of one or more items and associated contact information of a party that will share the bill. For example, the buyer paying buyer may select one or more items in the user interface and may enter contact information for a buyer that will be sharing the cost of the selected items. Further, in other examples, rather than selecting specific items for sharing the bill, the bill may be divided equally by the number of parties that will be sharing the bill.

At 820, the computing device may send, based on the contact information associated with the party that will share the bill, a request for reimbursement for a portion of the bill. For example, a peer-to-peer payment module on the buyer device may send a request in an electronic communication to the contact information associated with the sharing party. In some instances, the peer-to-peer payment module may be configured to transfer money between an account of the sharing buyer and an account of the paying buyer based on debit card information associated with each account.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 9:
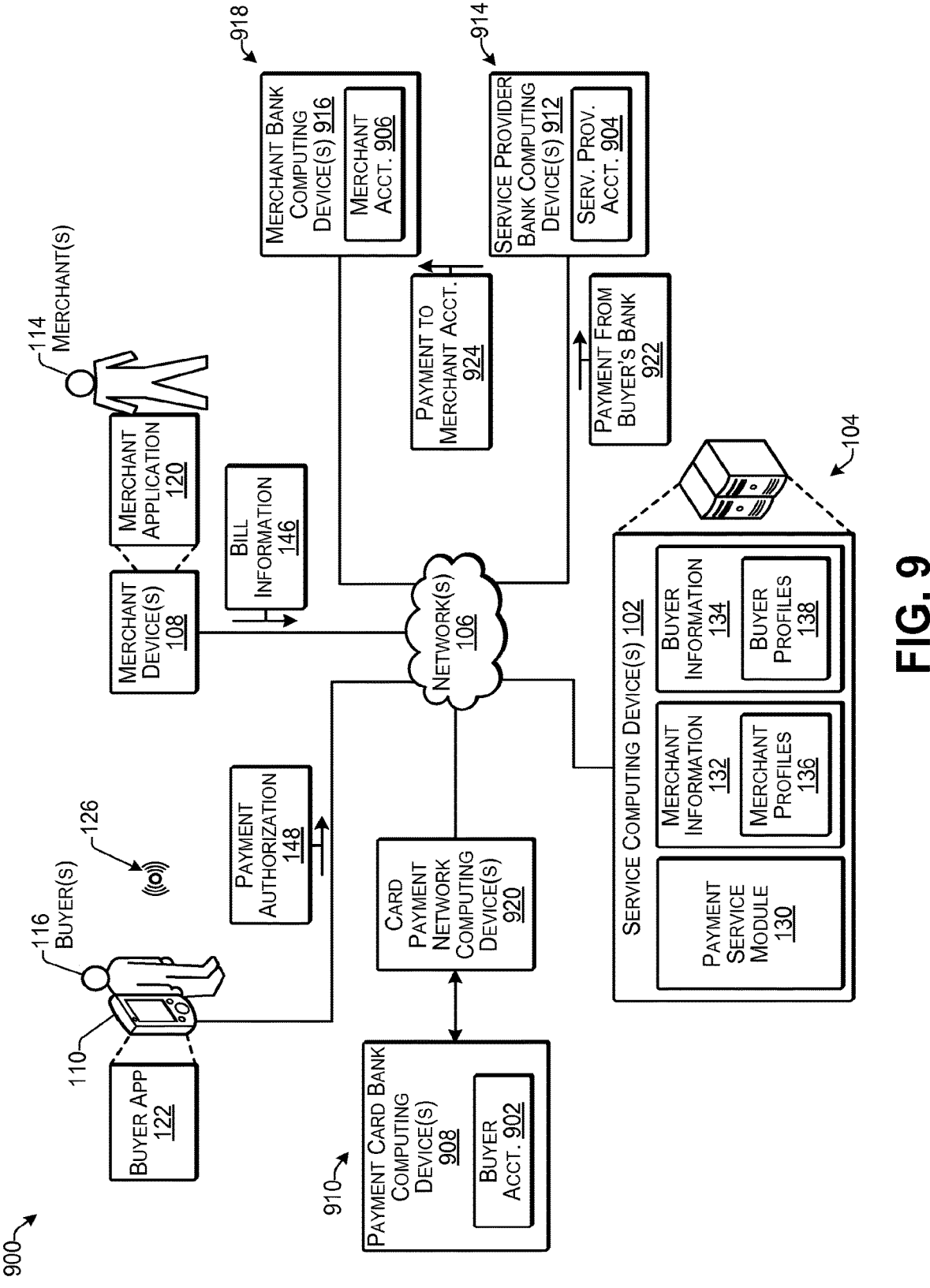
FIG. 9 illustrates an example architecture of a system for providing a payment service according to some implementations.

FIG. 9 illustrates an example architecture of a payment system 900 able to provide a payment service according to some implementations. In the example of FIG. 9, the service computing device 102 of the service provider 104 includes the payment service module 130, which may be executed to provide the location-based payment and POS transaction processing service discussed herein. The payment system 900 may further include the one or more merchant devices 108 associated with one or more respective merchants 114 and one or more buyer devices 110 associated with one or more respective buyers 116. Accordingly, the service computing device 102, the merchant device 108, and the buyer device 110 may be able to communicate with each other over the one or more networks 106.

The one or more networks 106 can include any appropriate network, including a wide area network, such as the Internet; a local area network, such as an intranet; a wireless network, such as a cellular network, a local wireless network, such as Wi-Fi and/or close-range wireless communications, such as Bluetooth® and Bluetooth® low energy; a wired network; or any other communication network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The service computing device 102 may include one or more servers that are configured to perform secure electronic financial transactions, e.g., electronic payments for transactions between the buyer and the merchant, for example, through data communicated between the buyer device 110 and the service computing device 102, and data communicated between the merchant device 108 and the service computing device 102. Generally, when a buyer 116 and a merchant 114 enter into an electronic payment transaction, such as for payment of a bill, the transaction is processed by electronically transferring funds from a financial account associated with a buyer profile 138, i.e., a buyer account 902, to a financial account associated with the service provider 104, i.e., a service provider account 904, and transferring funds from the service provider account 904 to a financial account associated with a merchant profile 136, i.e., a merchant account 906.

In some examples, the buyer account 902 may be maintained by one or more payment card bank computing devices 908 associated with a card-issuing bank 910 that issued a payment card to the buyer 116. For example, the buyer 116 may have provided payment card information from a particular payment card to the service provider 104 when signing up to use the electronic payment capability offered by the buyer application 122. Furthermore, the service provider account 904 may be maintained by one or more service provider bank computing devices 912 associated with a service provider bank 914. Additionally, the merchant account 906 may be maintained by one or more merchant bank computing devices 916 associated with a merchant bank 918.

The payment service module 130 and/or the merchant application 120 can also be configured to communicate with the one or more computing devices 920 of a card payment network (e.g., MasterCard®, VISA®) over the one or more networks 106 to obtain authorizations to charge payments to the buyer account 902. For example, the payment service module 130 may communicate with the service provider bank 914, which acts as an acquiring bank, and/or may communicate directly or indirectly with the buyer bank 910, which acts as an issuing bank. An acquiring bank may be a registered member of a card association (e.g., Visa®, MasterCard®), and may be part of a card payment network. An issuing bank may issue payment cards to buyers, and may pay acquiring banks for purchases made by cardholders to which the issuing bank has issued a payment card. Accordingly, in some examples, the computing device of an acquiring bank may communicate with the computing device of a card-issuing bank to obtain payment. Further, in some examples, the buyer may use a debit card instead of a credit card, in which case, the bank computing device of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

When providing the payment service to the merchant 114, the payment service module 130 may receive bill information 146 and/or other transaction information for processing payments made by buyers. For example, the payment service module 130 may receive transaction information, such as an amount of a POS transaction and payment instrument information. For instance, if the buyer 116 is using a payment card, the payment service module 130 may verify that the payment card is able to be used to pay for the transaction, such as by contacting a card payment network clearinghouse computing device 920 or a payment card bank computing device 908.

In addition to payment cards, a buyer 116 may carry the buyer device 110, as discussed above. The buyer device 110 may include the buyer application 122, which enables an associated electronic payment account to be used as a payment instrument. In some cases, the electronic payment account of the buyer 116 may be linked to one of the buyer's payment cards, such as a credit card, or other buyer account 902. Accordingly, the buyer application 122 may enable the buyer 116 to pay for a transaction with the linked credit card without having to produce the credit card, thereby enabling a card-less payment to the merchant with the credit card. The buyer application 122 and the corresponding electronic payment account, can be associated with the buyer profile 138 and various buyer information 134 including, for example, the buyer's name, information describing the payment card linked to the electronic payment account, and an email address linked to the electronic payment account to which receipts can be sent for electronic payment transactions that are conducted by the buyer 116 using the buyer application 122. Further, as an alternative to linking the electronic payment account to a credit card, the electronic payment account may be a different type of account, such as a billing account, a debit account, a savings account, a prepaid account having a prepaid quantity of money deposited therein, or the like. Additionally, while only a single buyer device 110 and a single merchant device 108 are illustrated in the example of FIG. 9, in some implementations, there may be thousands, hundreds of thousands, or more, of the buyer devices 110 and the merchant devices 108 associated with respective buyers 116 and merchants 114.

In general, when paying for a transaction, the buyer 116 can provide the amount of payment that is due to the merchant 114 using cash, check, a payment card, or by electronic payment using the buyer application 122 on the buyer device 110. The merchant 114 can interact with the merchant device 108 to process the transaction. For example, when the buyer is paying for a transaction electronically with the buyer application, the payment service module may contact the card payment network computing device 920 with the payment card information and the transaction amount to receive authorization for charging the buyer's payment card account 902 in the amount of the transaction. Similarly, if the buyer 116 were to pay the merchant with a physical payment card, the merchant application 120 may obtain payment authorization from the payment card network computing device 920 either directly or via the payment service module 130 of the service provider 104. During POS transactions, the merchant device 108 can determine and send data describing the transactions, including, for example, the item(s) being purchased, the amount of the item(s), buyer information, and so forth. In some implementations, the payment service enables a card-less payment transaction, which may include a transaction conducted between the buyer 116 and the merchant 114 at a POS location during which an electronic payment account of the buyer 116 is charged without the buyer 116 having to physically present a payment card to the merchant 114 at the POS location. Consequently, the merchant 114 need not receive any details about the financial account of the buyer 116 for the transaction to be processed.

When the buyer 116 authorizes the payment service module 130 to charge the buyer's electronic account, the payment service module 130 may apply the charge to the payment card that the buyer has previously provided in connection with the buyer application 122 and the buyer profile 138 of the buyer. Subsequently, the payment card issuing bank 910 may transfer the payment from the buyer account 902 to the service provider bank 914 as a payment 922 from the buyer's bank. Further, the payment service module 130 may credit the merchant's account, and may make a payment 924 from the service provider account 904 to the merchant account 906. As one example, both the payment 922 from the buyer's bank to the service provider bank, and the payment 924 from the service provider bank to the merchant account may be made through batch fund transfers. For instance, in the United States, bank-to-bank transfers of funds may be made using a batch fund transfer technique referred to as an ACH (automated clearing house) payment. ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

In some examples, the payment service module 130 is configured to determine whether a geographic location of the buyer device 110 is within a threshold geographic distance from a geographic location of the merchant device 108 or at an otherwise known geographic location, e.g., located at an establishment associated with the merchant device 108, or the like. The payment service module 130 can determine a geographic location of the buyer device 110 using, for example, geolocation data provided by the buyer device 110, such as GPS information. Similarly, the payment service module 130 can determine a geographic location of the merchant device 108 using, for example, geolocation data provided by the merchant device 108 or using a geographic address, e.g., street address, provided by the merchant and associated with the merchant profile of the merchant. Alternatively, the payment service module 130 may use location indicator information from a location indicator 126 to determine the location of the buyer device 110, as discussed above.

Figure 10:
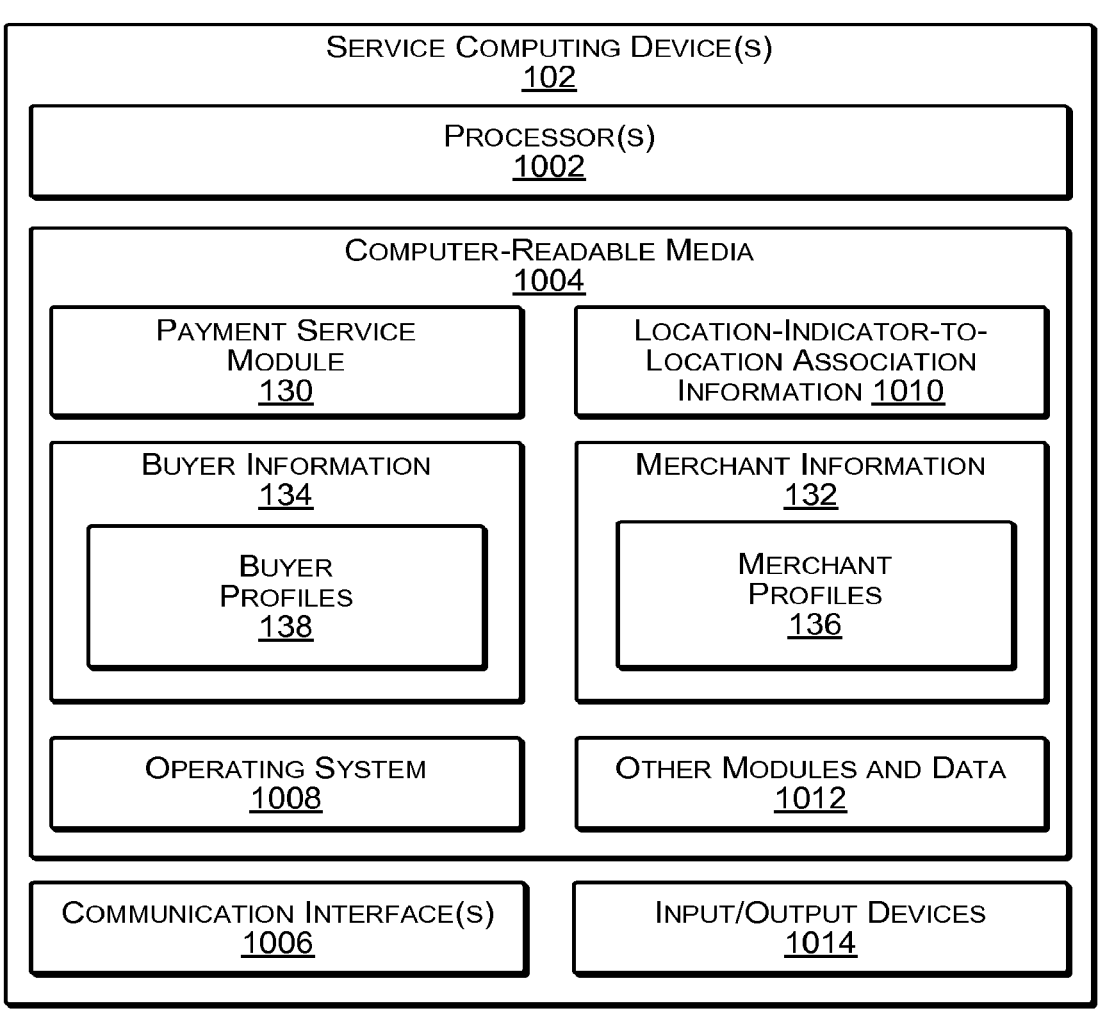
FIG. 10 illustrates select components of one or more example service computing devices according to some implementations.

FIG. 10 illustrates select components of the service computing device 102 that may be used to implement some functionality of the payment service described herein. The service computing device 102 may be maintained and/or operated by the service provider 104 that provides the payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 1002, one or more computer-readable media 1004, and one or more communication interfaces 1006. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or otherwise configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1004 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure or otherwise program the one or more processors 1002 to perform the actions attributed above to the service computing device 102. Functional components stored in the computer-readable media 1004 may include the payment service module 130, as described above, which may be executed to provide the payment service. Additional functional components stored in the computer-readable media 1004 may include an operating system 1008 for controlling and managing various functions of the service computing device(s) 102.

In addition, the computer-readable media 1004 may store data used for performing the operations described herein. Thus, the computer-readable media may store the merchant information 132, including the merchant profiles 136, and the buyer information 134, including the buyer profiles 138. Further, in some examples, the computer-readable media 1004 may store location-indicator-to-location association information 1010, which may be a data structure that provides a correlation between location indicator IDs and physical locations. The service computing device 102 may also include or maintain other functional components and data, such as other modules and data 1012, which may include programs, drivers, etc., and the data used or generated by the functional components. Further, the service computing device 102 may include many other logical, programmatic and physical components, of which those described above are merely examples that are related to the discussion herein.

The communication interface(s) 1006 may include one or more interfaces and hardware components for enabling communication with various other devices, such as over the network(s) 106. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 1014. Such I/O devices 1014 may include a display, various user interface controls (e.g., buttons, joystick, keyboard, mouse, touch screen, etc.), audio speakers, connection ports, and so forth.

Figure 11:
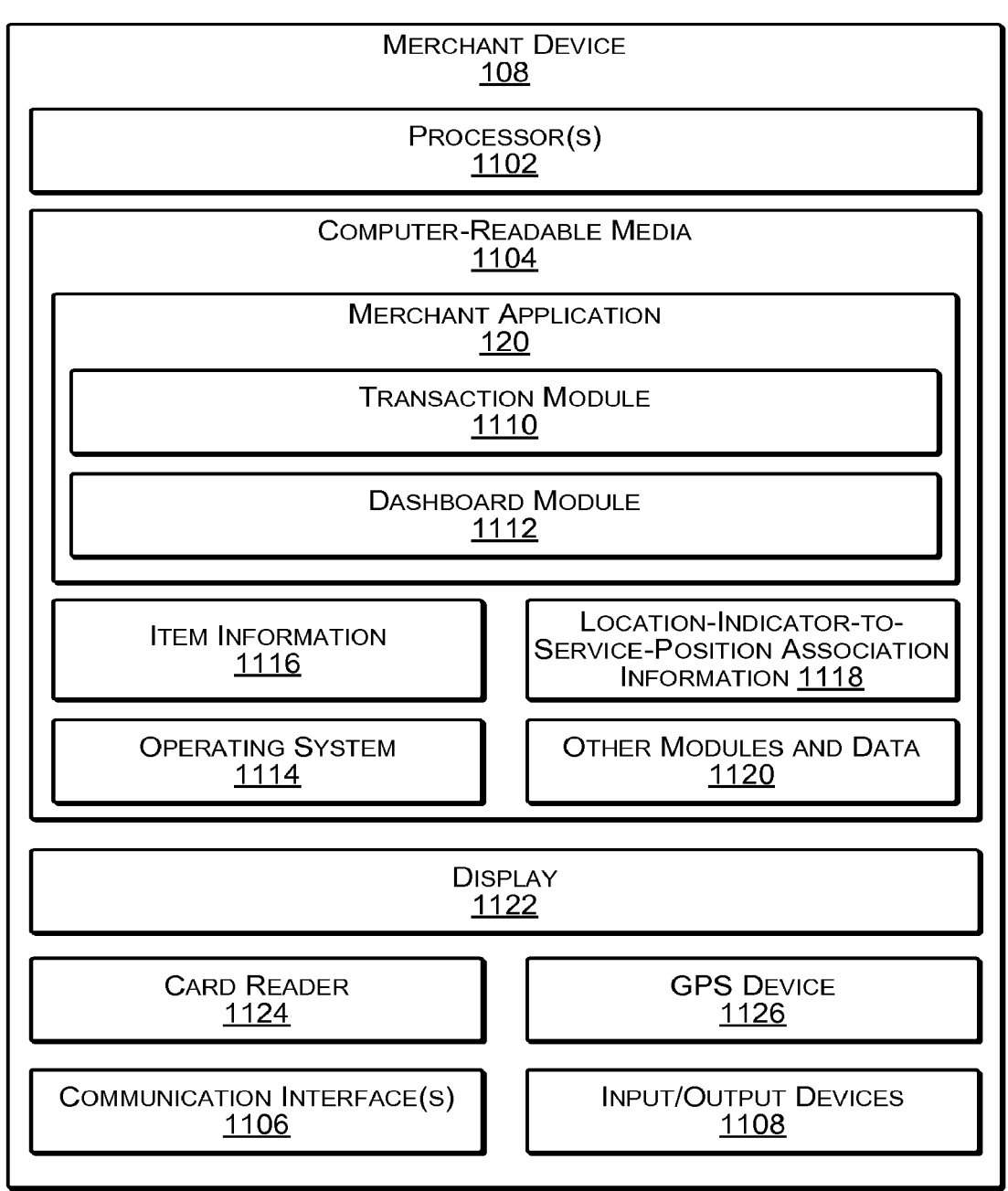
FIG. 11 illustrates select components of an example merchant device according to some implementations.

FIG. 11 illustrates select example components of an example merchant device 108 according to some implementations. The merchant device 108 may be any suitable type of computing device, e.g., portable, semi-portable, semi-stationary, or stationary. Some examples of the merchant device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 108 includes at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or otherwise configured to execute the algorithms and processes described herein. The processor 1102 can be configured to fetch and execute computer-readable processor-executable instructions stored in the computer-readable media 1104.

Depending on the configuration of the merchant device 108, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the merchant device 108 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the merchant device 108. Functional components of the merchant device 108 stored in the computer-readable media 1104 may include the merchant application 120. In this example, the merchant application 120 includes a transaction module 1110 and a dashboard module 1112. For example, the transaction module 1110 may present an interface, such as a payment interface, to enable the merchant to conduct transactions, receive payments, and so forth, as well as for communicating with the service computing device 102 for processing payments and sending transaction information. Further, the dashboard module 1112 may present a setup interface to enable the merchant to setup items, such as for adding new items to a menu, modifying information for existing items, and so forth. The dashboard module 1112 may further enable the merchant to manage the merchant's account, the merchant's profile, merchant's preferences, view saved or new information, and the like. Additional functional components may include an operating system 1114 for controlling and managing various functions of the merchant device 108 and for enabling basic user interactions with the merchant device 108.

In addition, the computer-readable media 1104 may also store data, data structures, and the like, that are used by the functional components. For example, data stored by the computer-readable media 1104 may include item information 1116 that includes information about the items offered by the merchant, which may include a menu or other list of items currently available from the merchant, images of the items, descriptions of the items, prices of the items, and so forth. Furthermore, the computer readable media may have stored thereon location-indicator-to-service position information 1118, which may be a data structure that describes a correlation between location indicator IDs and physical locations, such as service positions at an establishment of the merchant. Depending on the type of the merchant device 108, the computer-readable media 1104 may also optionally include other functional components and data, such as other modules and data 1120, which may include programs, drivers, etc., and the data used or generated by the functional components. Further, the merchant device 108 may include many other logical, programmatic and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 11 further illustrates that the merchant device 108 may include a display 1122 mentioned above. Depending on the type of computing device used as the merchant device 108, the display 1122 may employ any suitable display technology. For example, the display 1122 may be a liquid crystal display, a plasma display, a light emitting diode display, an OLED (organic light-emitting diode) display, an electronic paper display, or any other suitable type of display able to present digital content thereon. In some examples, the display 1122 may have a touch sensor associated with the display 1122 to provide a touchscreen display configured to receive touch inputs for enabling interaction with a user interface presented on the display 1122. Accordingly, implementations herein are not limited to any particular display technology. Alternatively, in some examples, the merchant device 108 may not include the display 1122, and information may be presented by other means, such as aurally.

The merchant device 108 may further include the one or more I/O devices 1108. The I/O devices 1108 may include speakers, a microphone, a camera, and various user controls (e.g., buttons, a joystick, a keyboard, a keypad, etc.), a haptic output device, and so forth.

In addition, the merchant device 108 may include or may be connectable to a card reader 1124. In some examples, the card reader may plug in to a port in the merchant device 108, such as a microphone/headphone port, a data port, or other suitable port. The card reader 1124 may include a read head for reading a magnetic strip of a payment card, and further may include encryption technology for encrypting the information read from the magnetic strip. Alternatively, numerous other types of card readers may be employed with the merchant device 108 herein, depending on the type and configuration of the merchant device 108.

Other components included in the merchant device 108 may include various types of sensors, which may include a GPS device 1126 able to indicate location information, as well as other sensors (not shown) such as an accelerometer, gyroscope, compass, proximity sensor, and the like. Additionally, the merchant device 108 may include various other components that are not shown, examples of which include removable storage, a power source, such as a battery and power control unit, and so forth.

Figure 12:
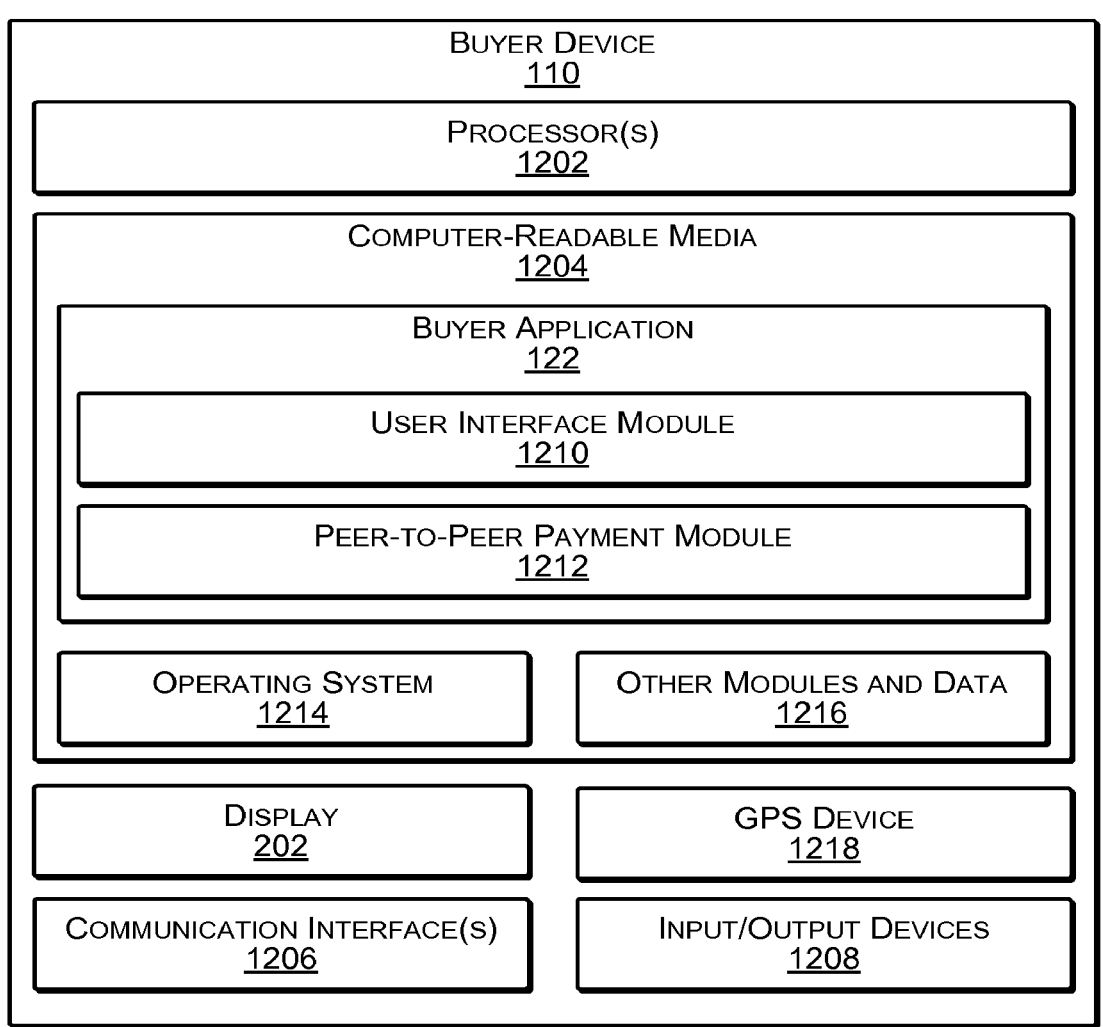
FIG. 12 illustrates select components of an example buyer device according to some implementations.

FIG. 12 illustrates select example components of the buyer device 110 that may implement the functionality described above according to some examples. The buyer device 110 may be any of a number of different types of portable computing devices. Some examples of the buyer device 110 may include smart phones and mobile communication devices; tablet computing devices; laptops, netbooks and other portable computers; wearable computing devices and/or body-mounted computing devices, which may include watches, wrist bands, and augmented reality devices, such as helmets, goggles or glasses; and any other portable device capable of sending communications and performing the functions according to the techniques described herein.

In the example of FIG. 12, the buyer device 110 includes components such as at least one processor 1202, one or more computer-readable media 1204, the one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or otherwise configured to execute the algorithms and processes described herein. The processor 1202 can be configured to fetch and execute computer-readable processor-executable instructions stored in the computer-readable media 1204.

Depending on the configuration of the buyer device 110, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the buyer device 110 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the buyer device 110. Functional components of the buyer device 110 stored on the computer-readable media 1204 may include the buyer application 122, as discussed above. In this example, the buyer application 122 includes a user interface module 1210 and a peer-to-peer payment module, as discussed above. For example, the user interface module 1210 may present the buyer with interfaces for making payments, managing the buyer's account, changing buyer profile information, changing preferences, and so forth. Further, the peer-to-peer payment module 1212 may enable the buyer to send or receive a request for money, such as by communicating with a similar peer-to-peer payment module on a buyer device associated with another buyer. Additional functional components may include an operating system 1214 for controlling and managing various functions of the buyer device 110 and for enabling basic user interactions with the buyer device 110.

In addition, the computer-readable media 1204 may also store data, data structures and the like, that are used by the functional components. Depending on the type of the buyer device 110, the computer-readable media 1204 may also optionally include other functional components and data, such as other modules and data 1216, which may include applications, programs, drivers, etc., and the data used or generated by the functional components. Further, the buyer device 110 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the buyer device 110 may include the display 202, mentioned above. Depending on the type of computing device used as the buyer device 110, the display 202 may employ any suitable display technology. For example, the display 202 may be a liquid crystal display, a plasma display, a light emitting diode display, an OLED (organic light-emitting diode) display, an electronic paper display, or any other suitable type of display able to present digital content thereon. In some examples, the display 202 may have a touch sensor associated with the display 202 to provide a touchscreen display configured to receive touch inputs for enabling interaction with a graphic interface presented on the display 202. Accordingly, implementations herein are not limited to any particular display technology. Alternatively, in some examples, the buyer device 110 may not include a display.

The buyer device 110 may further include the one or more I/O devices 1208. The I/O devices 1208 may include speakers, a microphone, a camera, and various user controls (e.g., buttons, a joystick, a keyboard, a keypad, etc.), a haptic output device, and so forth.

Other components included in the buyer device 110 may include various types of sensors, which may include a GPS device 1218 able to indicate location information, as well as other sensors (not shown) such as an accelerometer, gyroscope, compass, proximity sensor, and the like. Additionally, the buyer device 110 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A payment service system comprising:
one or more memories having computer-readable instructions stored therein; and
one or more processors configured to execute the computer-readable instructions to:
receive, from one or more devices communicatively coupled to the payment service system, first beacon information of a first wireless beacon detected by the one or more devices in proximity of the one or more devices, the first wireless beacon identifying a first location within an establishment of a merchant at which one or more customers associated with the one or more devices are located, each of the one or more customers and the merchant having a corresponding account with the payment service system;
identify the establishment based on the first location identified in the first beacon information;
associate the one or more devices of the one or more customers with a group conducting transactions with the merchant;
maintain communication sessions with the one or more devices in the group and a merchant device of the merchant to generate a respective transaction record for each of the one or more customers in the group, each respective transaction record identifying one or more of the transactions conducted by a respective one of the one or more customers;
receive second beacon information of a second wireless beacon at a second location associated with the establishment, wherein
the second beacon information identifies a presence of a first device, from among the one or more devices, at the second location,
the second beacon information indicates that the first device is no longer present at the establishment, and
the second beacon information is received while at least a second device from among the one or more devices remains with the group and present at the first location when the first device is no longer present at the establishment; and
process a cardless payment for an amount owed for the respective transaction record associated with a respective customer of the first device after receiving the second beacon information indicating that the first device is no longer present at the establishment, wherein the cardless payment is processed without an exchange of payment information between the first device and any one of the payment service system and the merchant device.

2. The payment service system of claim 1, wherein the one or more processors are further configured to execute the computer-readable instructions to send a notification to the merchant device, the notification including an indication of a processed payment for the amount owed.

3. The payment service system of claim 1, wherein the first wireless beacon is installed at a table at which the one or more customers sit once at the establishment and the second beacon information is received from a second wireless beacon installed at an entrance of the establishment.

4. The payment service system of claim 1, wherein the one or more processors are further configured to execute the computer-readable instructions to:

receive, from the merchant device, menu information for one or more items offered for purchase at the establishment;

send the menu information to the one or more devices of the one or more customers;

receive, from the one or more devices, an order for at least one of the one or more items based at least in part on the menu information;

send the order and the first location to the merchant device; and generate the respective transaction record to include the order.

5. The payment service system of claim 1, wherein the one or more processors are configured to execute the computer-readable instructions to process the cardless payment by:

charging the corresponding account of the respective customer of the first device at the payment service system for the amount owed; and crediting the corresponding account of the merchant at the payment service system for the amount owed.

6. The payment service system of claim 1, wherein the second beacon information is received from the first device or the merchant device.

7. The payment service system of claim 1, wherein each of the first device and the merchant device has a respective application executed thereon, the respective application being provided by the payment service system.

8. One or more non-transitory computer-readable media comprising computer-readable instructions, which when executed by one or more processors of a payment service system, cause the payment service system to:

receive, from one or more devices communicatively coupled to the payment service system, first beacon information of a first wireless beacon detected by the one or more devices in proximity of the one or more devices, the first wireless beacon identifying a first location within an establishment of a merchant at which one or more customers associated with the one or more devices are located, each of the one or more customers and the merchant having a corresponding account with the payment service system;

identify the establishment based on the first location identified in the first beacon information;

associate the one or more devices of the one or more customers with a group conducting transactions with the merchant;

maintain communication sessions with the one or more devices in the group and a merchant device of the merchant to generate a respective transaction record for each of the one or more customers in the group, each respective transaction record identifying one or more of the transactions conducted by a respective one of the one or more customers;

receive second beacon information of a second wireless beacon at a second location associated with the establishment, wherein the second beacon information identifies a presence of a first device, from among the one or more devices, at the second location, the second beacon information indicates that the first device is no longer present at the establishment, and the second beacon information is received while at least a second device from among the one or more devices remains with the group and present at the first location when the first device is no longer present at the establishment; and process a cardless payment for an amount owed for the respective transaction record associated with a respective customer of the first device after receiving the second beacon information indicating that the first device is no longer present at the establishment, wherein the cardless payment is processed without an exchange of payment information between the first device of the respective customer and any one of the payment service system and the merchant device.

9. The one or more non-transitory computer-readable media of claim 8, wherein execution of the computer-readable instructions by the one or more processors further cause the payment service system to send a notification to the merchant device, the notification including an indication of a processed payment for the amount owed.

10. The one or more non-transitory computer-readable media of claim 8, wherein the first wireless beacon is installed at a table at which the one or more customers sit once at the establishment and the second beacon information is received from a second wireless beacon installed at an entrance of the establishment.

11. The one or more non-transitory computer-readable media of claim 8, wherein execution of the computer-readable instructions by the one or more processors further cause the payment service system to:

receive, from the merchant device, menu information for one or more items offered for purchase at the establishment;

send the menu information to the one or more devices of the one or more customers;

receive, from the one or more devices, an order for at least one of the one or more items based at least in part on the menu information;

send the order and the first location to the merchant device; and generate the respective transaction record to include the order.

12. The one or more non-transitory computer-readable media of claim 8, wherein execution of the computer-readable instructions by the one or more processors further cause the payment service system to process the cardless payment by:

charging the corresponding account of the respective customer of the first device at the payment service system for the amount owed; and crediting the corresponding account of the merchant at the payment service system for the amount owed.

13. A method comprising:

receiving, from one or more devices communicatively coupled to a payment service system, first beacon information of a first wireless beacon detected by the one or more devices in proximity of the one or more devices, the first wireless beacon identifying a first location within an establishment of a merchant at which one or more customers associated with the one or more devices are located, each of the one or more customers and the merchant having a corresponding account with the payment service system;

identifying the establishment based on the first location identified in the first beacon information;

associating the one or more devices of the one or more customers with a group conducting transactions with the merchant;

maintaining communication sessions with the one or more devices in the group and a merchant device of the merchant to generate a respective transaction record for each of the one or more customers in the group, each respective transaction record identifying one or more of the transactions conducted by a respective one of the one or more customers;

receiving second beacon information of a second wireless beacon at a second location associated with the establishment, wherein the second beacon information identifies a presence of a first device, from among the one or more devices, device at the second location, the second beacon information indicates that the first device is no longer present at the establishment, and the second beacon information is received while at least a second device from among the one or more devices remains with the group and present at the first location when the first device is no longer present at the establishment; and processing a cardless payment for an amount owed for the respective transaction record associated with a respective customer of the first device after receiving the second beacon information indicating that the first device is no longer present at the establishment, wherein the cardless payment is processed without an exchange of payment information between the first device of the respective customer and any one of the payment service system and the merchant device.

14. The method of claim 13, further comprising:

sending a notification to the merchant device, the notification including an indication of a processed payment for the amount owed.

15. The method of claim 13, wherein the first wireless beacon is installed at a table at which the one or more customers sit once at the establishment and the second beacon information is received from a second wireless beacon installed at an entrance of the establishment.

16. The method of claim 13, wherein generating the respective transaction record comprises:

receiving, from the merchant device, menu information for one or more items offered for purchase at the establishment;

sending the menu information to the one or more devices of the one or more customers;

receiving from the one or more devices, an order for at least one of the one or more items based at least in part on the menu information;

sending the order and the first location to the merchant device; and generating the respective transaction record to include the order.

17. The method of claim 13, further comprising:

sending a confirmation to the first device after processing the cardless payment, wherein the confirmation includes instructions for adding a gratuity.

18. The payment service system of claim 1, wherein the second beacon information triggers an automatic processing of the cardless payment for the amount owed.

19. The payment service system of claim 18, wherein the one or more processors are further configured to execute the computer-readable instructions to:

upon receiving the second beacon information, send a request to the merchant device to request a bill for the group; and determine, using the bill, the amount owed by the respective customer of the first device.

20. The payment service system of claim 18, wherein the payment service system maintains a database that includes associations between the establishment, a plurality of wireless beacons installed at the establishment, and a corresponding location of each of the plurality of wireless beacons, wherein the one or more processors are further configured to execute the computer-readable instructions to identify the establishment based on the first beacon information and the database.

* * * * *